United States Patent
O'Neill et al.

(10) Patent No.: US 10,670,826 B2
(45) Date of Patent: Jun. 2, 2020

(54) AUXILIARY OPTICAL SYSTEMS FOR MOBILE DEVICES

(71) Applicant: Portero Holdings, LLC, Lake Forest, CA (US)

(72) Inventors: Patrick D. O'Neill, Huntington Beach, CA (US); Chong Pak, Long Beach, CA (US); Jason Patrick, Long Beach, CA (US); Daniel Arato, Los Angeles, CA (US); Ryan Nguyen, Fountain Valley, CA (US); Joshua Cantor, Huntington Beach, CA (US)

(73) Assignee: Portero Holdings, LLC, Lake Forest, CA (US)

( * ) Notice: Subject to any disclaimer, the term of this patent is extended or adjusted under 35 U.S.C. 154(b) by 70 days.

(21) Appl. No.: 15/674,469

(22) Filed: Aug. 10, 2017

(65) Prior Publication Data

US 2018/0045910 A1    Feb. 15, 2018

Related U.S. Application Data

(60) Provisional application No. 62/374,695, filed on Aug. 12, 2016, provisional application No. 62/395,318, filed on Sep. 15, 2016.

(51) Int. Cl.
*G02B 7/02* (2006.01)
*G02B 15/10* (2006.01)
*G02B 7/14* (2006.01)
*H04M 1/02* (2006.01)

(52) U.S. Cl.
CPC ............. *G02B 7/021* (2013.01); *G02B 7/023* (2013.01); *G02B 7/14* (2013.01); *G02B 15/10* (2013.01); *H04M 1/0254* (2013.01); *H04M 1/0264* (2013.01)

(58) Field of Classification Search
CPC ...... G02B 7/002; G02B 15/10; G03B 17/565; G03B 17/566; G03B 17/568; H04M 1/0254; H04M 1/0264
USPC ........................ 359/811, 815, 818, 819, 827
See application file for complete search history.

(56) References Cited

U.S. PATENT DOCUMENTS

| 7,324,156 B2 * | 1/2008 | Lohr ........................ G02B 7/00 348/360 |
| 8,089,694 B2 * | 1/2012 | Wernersson ......... G02B 27/646 359/554 |
| 8,229,295 B2 * | 7/2012 | Wu ....................... G03B 17/566 348/375 |

(Continued)

*Primary Examiner* — Nicholas R. Pasko
(74) *Attorney, Agent, or Firm* — Dorsey & Whitney LLP

(57) ABSTRACT

Some embodiments disclosed herein relate to an auxiliary optical device having one or more optical components, such as lenses, attached to a retainer portion. The retainer portion is configured to removably attach to mobile electronic devices such as mobile phones, tablet computers, media players, and the like. The retainer portion may include a movable mounting portion that achieves or maintains a substantially parallel orientation with respect to a face of a mobile electronic device even when a sidewall of the retainer portion is not parallel with respect to the face. An optical component may be mounted to the mounting portion, and movement of the mounting portion can facilitate a parallel orientation of the optical axis of the optical component with respect to an optical axis of an onboard camera of the mobile device.

18 Claims, 17 Drawing Sheets

(56) References Cited

U.S. PATENT DOCUMENTS

| | | | |
|---|---|---|---|
| 8,279,544 B1 | 10/2012 | O'Neill | |
| 8,760,569 B2 * | 6/2014 | Yang | G06F 1/1632 |
| | | | 348/373 |
| 9,294,659 B1 * | 3/2016 | Bednarik | H04N 5/2254 |
| 10,088,738 B2 * | 10/2018 | O'Neill | G02B 7/021 |
| 10,148,799 B2 * | 12/2018 | O'Neill | H04B 1/3888 |
| 2007/0280677 A1 * | 12/2007 | Drake | G02B 7/02 |
| | | | 396/429 |
| 2012/0236425 A1 * | 9/2012 | O'Neill | G02B 7/14 |
| | | | 359/827 |
| 2014/0063292 A1 * | 3/2014 | Wagner | G01N 21/87 |
| | | | 348/231.99 |
| 2014/0078594 A1 * | 3/2014 | Springer | G02B 7/16 |
| | | | 359/672 |
| 2014/0267882 A1 * | 9/2014 | O'Neill | H04N 5/2254 |
| | | | 348/360 |
| 2015/0002950 A1 * | 1/2015 | O'Neill | G02B 7/14 |
| | | | 359/827 |
| 2015/0042877 A1 * | 2/2015 | O'Neill | H04N 5/2254 |
| | | | 348/376 |

\* cited by examiner

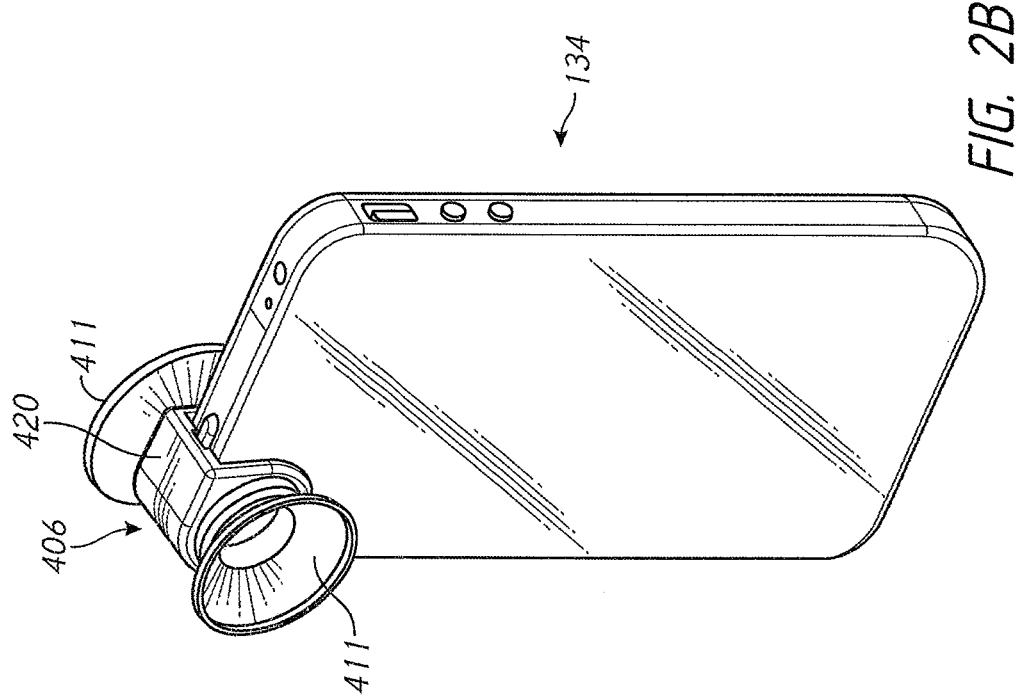
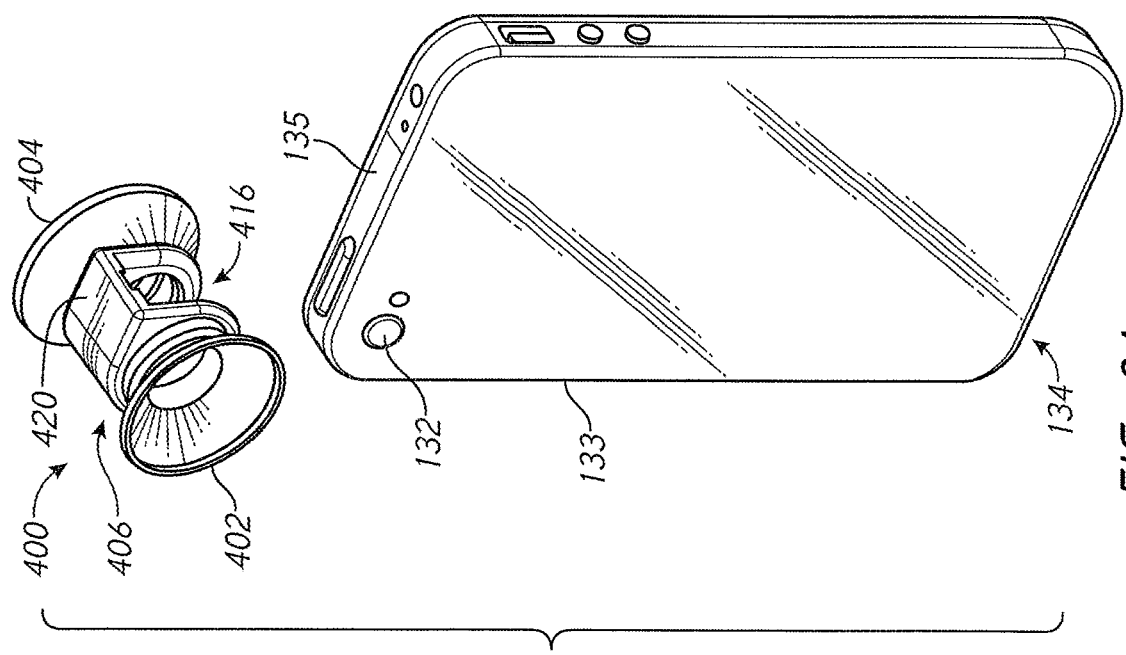

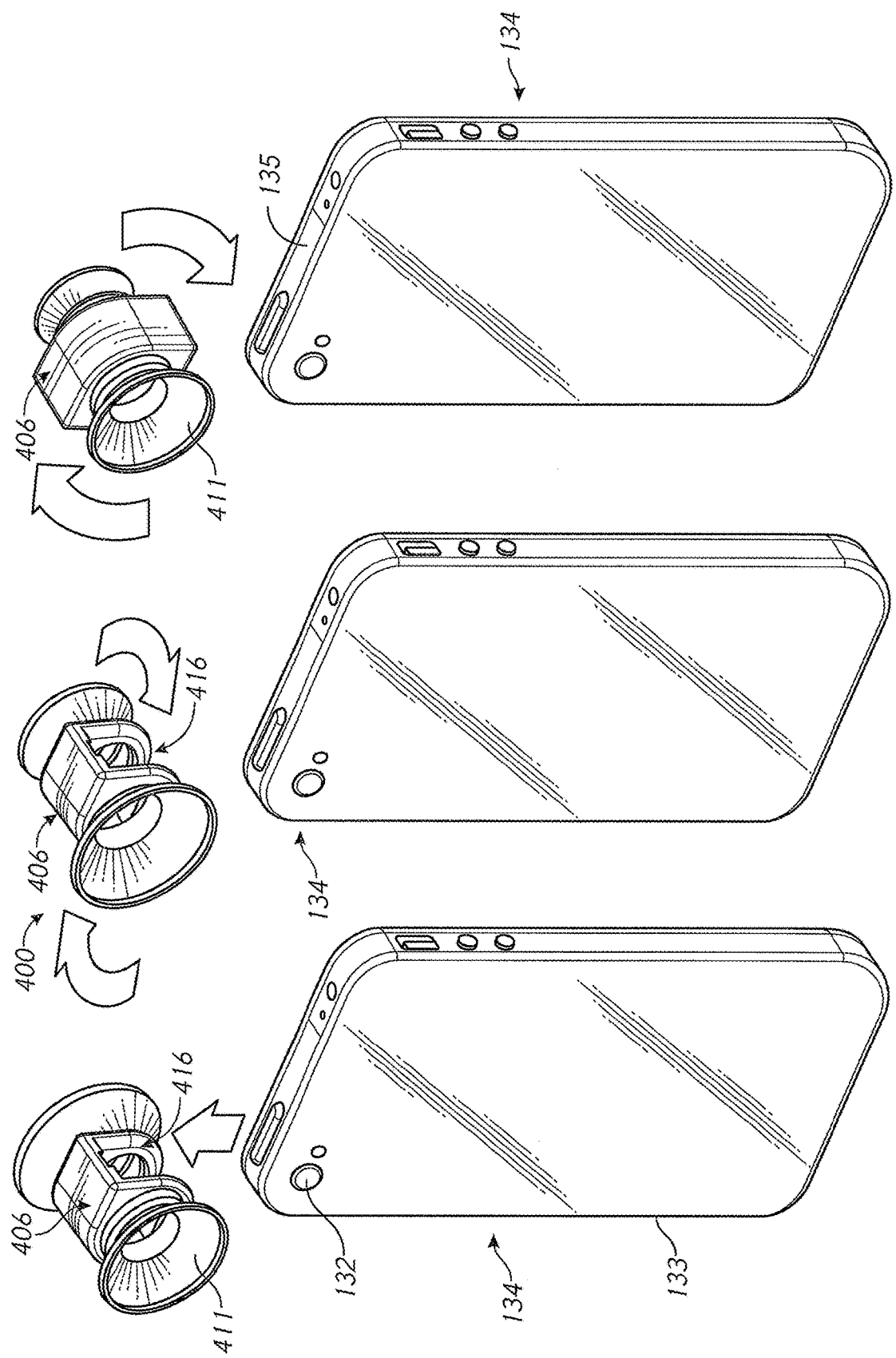

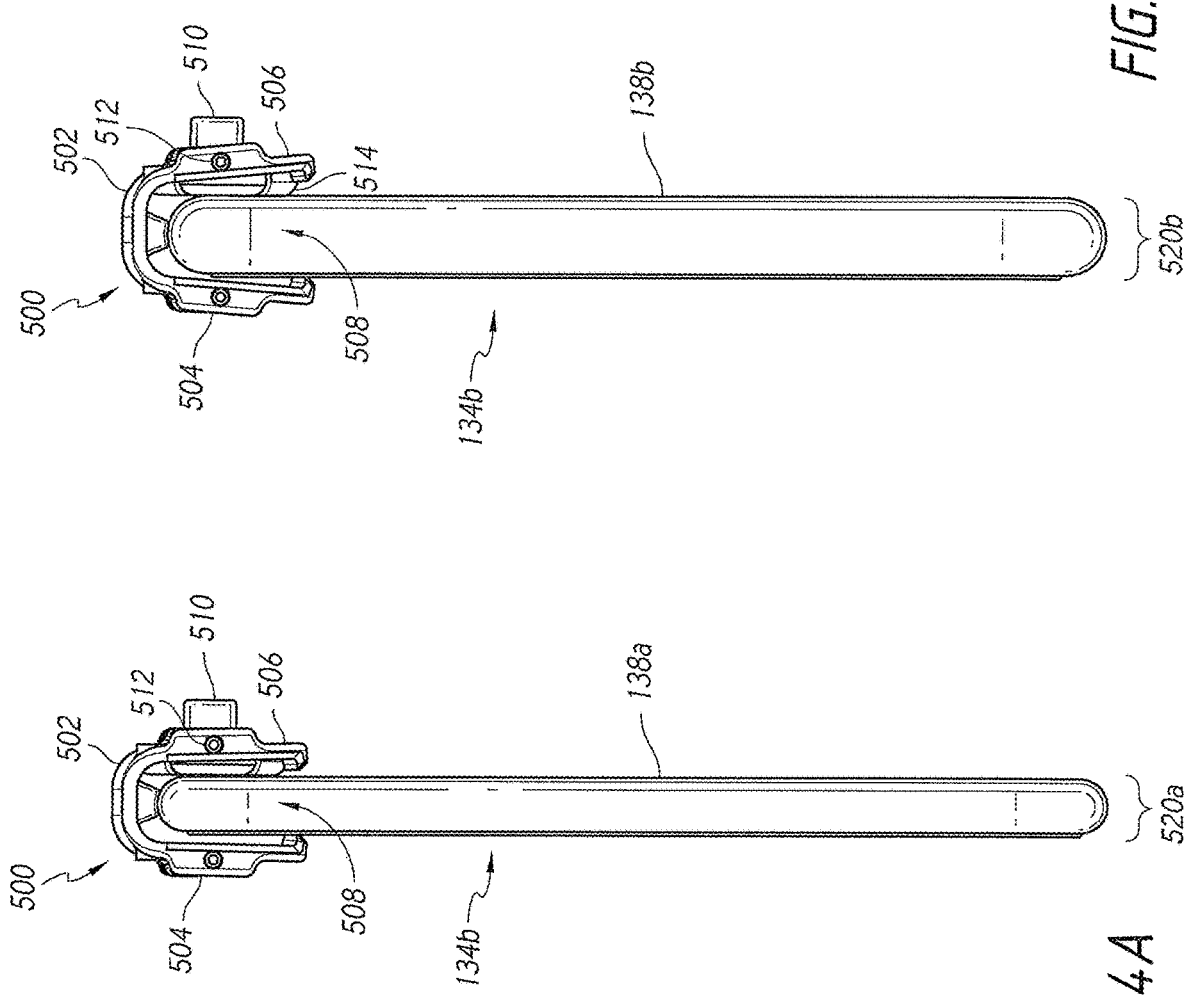

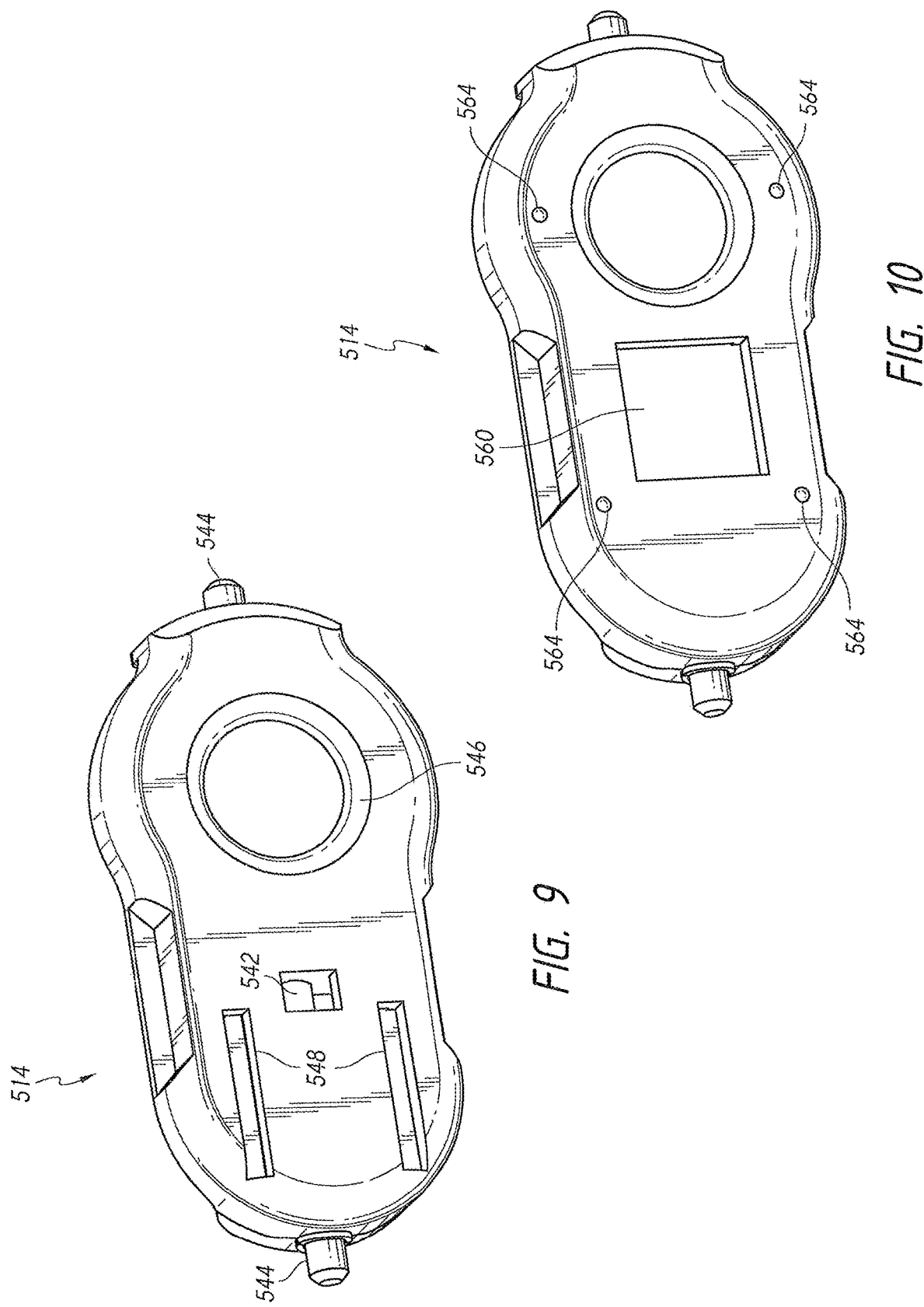

AUXILIARY OPTICAL SYSTEMS FOR MOBILE DEVICES

CROSS-REFERENCE TO RELATED APPLICATIONS

This application claims the priority benefit of U.S. Provisional Patent Application No. 62/374,695, filed on Aug. 12, 2016, and U.S. Provisional Patent Application No. 62/395,318, filed on Sep. 15, 2016, the entire contents of both of which are hereby incorporated by reference into this application.

BACKGROUND

Field

This invention relates generally to accessories for mobile devices (e.g., mobile telephones, mobile texting devices, personal media players, tablet devices, laptop computers, desktop computers, gaming devices, and/or devices capable of linking electronically to another device or to a network such as the Internet, etc.), and specifically to removable optical components for mobile devices.

Related Art

In recent years, many advances in computer networking and processing technology have made it possible for mobile devices to comprise cameras that permit users to capture images. In many cases, these images can be stored, processed, and transmitted. However, there are many design constraints on onboard cameras in mobile devices that can limit the weight, size, expense, shape, adjustability, flexibility, versatility, feature choices, and overall quality of the lensing systems of such cameras. Consequently, many cameras and mobile devices are inadequate for a wide variety of photographic needs and may produce lower quality photographic images, fewer image options, incompatibilities in attachment structures, weight, optics, size, transportation, storage, ergonomics, and/or portability.

SUMMARY

In some embodiments, an auxiliary optical system can be configured to be selectively attachable to a mobile electronic device having a user-facing onboard camera lens and an outward-facing onboard camera lens. The auxiliary optical system can comprise a mount or mounting portion, a first optical component mounted to or configured to be mounted to the mount or mounting portion, and a second optical component mounted to or configured to be mounted to the mount or mounting portion. The auxiliary optical system can be configured to be selectively attachable to the mobile electronic device in at least a first position and a second position, wherein in the first position the first optical component is configured to be in optical alignment with the user-facing onboard camera lens and simultaneously the second optical component is configured to be in optical alignment with the outward-facing onboard camera lens, and wherein in the second position the first optical component is configured to be in optical alignment with the outward-facing onboard camera lens and simultaneously the second optical component is configured to be in optical alignment with the user-facing onboard camera lens.

In some embodiments, an auxiliary optical device may comprise a retainer or a retainer portion and one or more mounts or mounting portions that are movable with respect to the retainer portion. The retainer or retainer portion is configured to removably attach to mobile electronic devices such as mobile phones, tablet computers, media players, and the like. The movable mount or mounting portion achieves or maintains a substantially parallel orientation with respect to a face of a mobile electronic device even when a sidewall of the retainer or retainer portion is not parallel with respect to the face. An optical component may be mounted to the mount or mounting portion, and movement of the mount or mounting portion can facilitate a substantially parallel orientation of the optical axis of the optical component with respect to the optical axis of an onboard camera of the mobile device, independent of whether a sidewall of the retainer or retainer portion is or is not parallel with respect to the face of the mobile electronic device.

BRIEF DESCRIPTION OF THE DRAWINGS

Certain embodiments of the inventions will now be discussed in detail with reference to the following figures. These figures are provided for illustrative purposes only and the inventions are not limited to the subject matter illustrated in the figures. For example, the labels and descriptions in text and in the drawings are examples only and should not be understood to limit the usage, materials, function, applicability, or any other aspect of the inventions disclosed herein. Rather, such labels and descriptions should be viewed as disclosing some examples of embodiments of a broader genus of structures and features that may or may not comprise specific attributes set forth in text in the drawings.

FIGS. 2A and 2B illustrate an example of the auxiliary optical system of FIGS. 1A-1E positioned for attachment on a mobile electronic device, and then attached to a mobile electronic device.

FIGS. 3A, 3B, and 3C illustrate an example of the auxiliary optical system of FIGS. 1A-1E being removed from the attachment position as shown in FIG. 2B, rotated about a generally vertical axis, and then reattached, so as to switch the positions of the front and rear optical components.

FIGS. 4A and 4B illustrate an example of an auxiliary optical system installed on mobile devices of varying thicknesses, and showing a mount or mounting portion of the auxiliary optical system in a parallel orientation with respect to surfaces of the mobile devices while a sidewall of the retainer clip of the auxiliary optical system is in different orientations with respect to the surfaces of the mobile devices.

FIGS. 8 and 9 illustrate different views of an example of a mount or mounting portion that may be configured to achieve a parallel orientation with respect to surfaces of mobile devices while a sidewall of the optical system is in different orientations with respect to the surfaces of the mobile devices.

FIG. 10 illustrates another example of a mount or mounting portion that may be configured to achieve a parallel orientation with respect to the surface of a mobile device.

DETAILED DESCRIPTION OF EMBODIMENTS

Figure 1A:
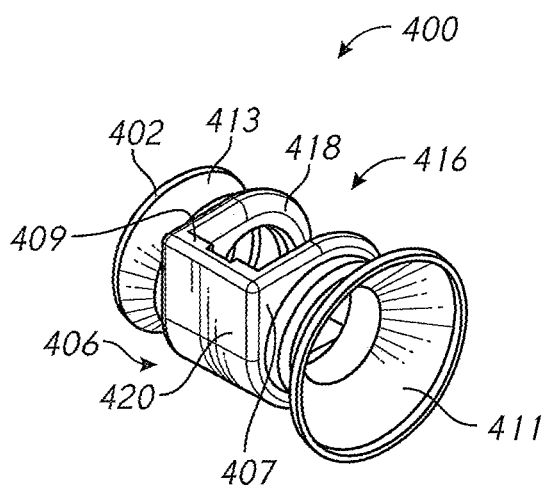
FIGS. 1A, 1B, 1C, 1D, and 1E illustrate an example of several views of an auxiliary optical system with a plurality of optical components used for different purposes.
Figure 1B:
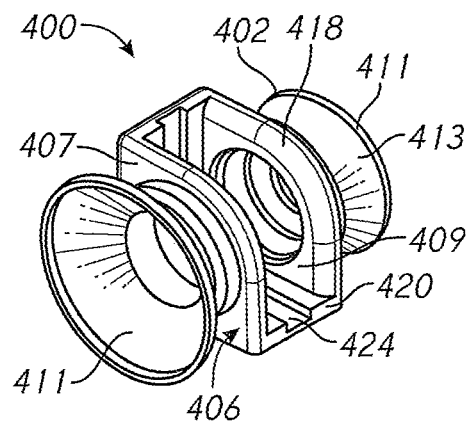

The following detailed description is now directed to certain specific examples of embodiments of the disclosure. In this description, reference is made to the drawings wherein like parts are designated with like numerals throughout the description and the drawings. The inventions are not limited to examples expressly limited or described in this specification. Various examples of auxiliary lensing systems are illustrated in the drawings and/or described in the text of this specification. Any feature, structure, step, material, or component that is illustrated and/or described in any embodiment in this specification can be used separately from the embodiment in which it is disclosed and/or illustrated, either individually, or in combination with another embodiment described and/or illustrated in this specification, or in combination with any embodiment that is not described and/or illustrated in this specification. For example, without limitation, any embodiment in this specification can include multiple lenses attachable to a single retainer, as illustrated in FIGS. 1A-3C, even if not illustrated or described, and/or any embodiment in this specification can be configured to be attached to a mobile communication device in a first orientation, detached from the communication device, rotated about a generally vertical axis, and reattached to the communication device in a second orientation. No feature, structure, step, material, or component disclosed and/or illustrated in this specification is essential or indispensable.

The term "lens" in this specification is used in its ordinary sense, and includes powered lenses (e.g., lenses that focus, magnify, enlarge, or otherwise alter the direction of light passing through the lens), plano lenses (e.g., lenses that are generally planar, lenses that do not taper in thickness, and/or lenses that are not powered), simple lenses, compound lenses, generally spherical lenses, generally toroidal lenses, generally cylindrical lenses, etc. Any imaging device described or illustrated in this specification can include a retainer attached to one or more lenses or optical regions with one or more different features, including but not limited to a constant or variable magnifying lens, a wide-angle lens, a fish-eye lens, a telescopic lens, a macro lens, a constant or variable polarizing lens, an anti-reflection lens, a contrast-enhancing lens, a light-attenuating lens, a colored lens, or any combination of the foregoing, etc.

The terms "mobile electronic devices" and "mobile devices" in this specification are used in their ordinary sense, and include mobile telephones, mobile texting devices, media players, electronic tablet devices, laptop computers, desktop computers, gaming devices, wearable electronic devices (e.g., "smart watches" or "smart eyewear"), and/or mobile electronic communication devices capable of linking electronically to another device or to a network such as the Internet, etc. Some mobile electronic devices include one or more onboard cameras that can be used for various imaging purposes, such as photography and video recording. In addition, some mobile electronic devices include one or more illumination components, such as one or more lights, and/or flashes, etc., that can be used for photography, videography, and/or other purposes (e.g., as a flash light).

Referring to FIGS. 1A-3C, an example of a removably attachable auxiliary optical device 400 is illustrated in many different views. The auxiliary optical device may also be referred to as an auxiliary optical system. In some embodiments, as illustrated, the auxiliary optical device 400 can generally comprise a retainer portion 406 and one or a plurality of lens portions 402, 404. The retainer portion 406 is generally configured to be removably attachable to a mobile electronic communication device such that the one or more optical portions, such as lens portions 402, 404, can be positioned in a region generally covering or near an onboard camera lens in the communication device to enable the one or more lens portions 402, 404 to cooperate optically with the onboard camera, to provide different optical enhancements, improvements, modifications, and/or alternatives, such as one or more of the following: magnification, telephoto, wide angle, fish-eye, polarization, glare reduction, anti-reflection, light filtering or attenuation at particular ranges of wavelengths, and/or coloring, etc. As with all features, structures, steps, materials, or components disclosed and/or illustrated in this specification, any of the foregoing optical features or combinations thereof can be included in any device in this specification. Any of the lenses can be of any suitable shape or configuration, such as plano, spherical, parabolic, cylindrical, toroidal, and/or simple or compound, etc. In some embodiments, as illustrated, the retainer portion 406 is shaped so as to attach to the communication device in a region and in a manner that permits a user to see all or virtually all of a viewing portion (not shown) of the communication device without obstruction or without appreciable obstruction.

One or more of the lens portions 402, 404 can be removably attached to the retainer portion 406 with a securing structure, such as a screw thread, a bayonet mount, a friction fit, a snap fit, a clip, and/or a clasp, etc. One or more of the lens portions 402, 404 can be interchangeable or replaceable with one or more other lens portions with one or more different optical features, such as any of the optical features described elsewhere in this specification.

In some embodiments, the retainer portion 406 can comprise a channel 416 with a plurality of sidewalls or side retaining structures 407, 409. In some embodiments, the retainer portion 406 comprises only a single sidewall or side retaining structure, or no sidewall or side retaining structure. The width of the channel 416, e.g., the distance between the respective sidewalls or side retaining portions 407, 409, can be configured to be generally complimentary to the thickness of a portion of the communication device(s) 134 on which the retainer portion 406 is configured to attach. In some embodiments, the natural width of the channel 416 (e.g., before attachment to a communication device) is approximately the same size or slightly smaller than the thickness of a corner, such as an upper corner, of the outside housing of a communication device near the light aperture of the onboard camera of the communication device. In some embodiments, the natural width of the channel 416 is approximately the same size or slightly smaller than the thickness of another portion of the outside housing, such as an upper central region, or another location.

In some embodiments, as illustrated, one or more of the plurality of walls 407, 409 can have a curvilinear shape along one or more edges to permit the retainer portion 406 to provide increased distance of contact along the edge of the communication device while diminishing the area across a transverse surface of the device that is obstructed by the retainer portion 406. For example, in some embodiments, as illustrated, the curvilinear shape along one or more edges of the walls 407, 409 permits the retainer portion 406 to extend along and attach to at least a portion of two generally converging or generally perpendicular outer edges or sides of a communication device that is approximately as wide as either of the lens portions 402, 404, while diminishing the amount of space on the front of the electronic communication device that is blocked. In the example shown in FIGS. 1A-3C, the curvilinear shape of the edge of the walls 407, 409 can comprise a rounded corner, and avoid or omit a lower pointed or sharp corner that may otherwise extend into and obstruct the viewing portion of the communication device. In some embodiments, the auxiliary optical device 400 does not appreciably block or obstruct the viewing surface of the mobile electronic communication device when attached.

All or part of the retainer portion 406, such as one or more of the plurality of walls 407, 409, can be made of a material (e.g., a polymer or a silicone) that is sufficiently flexible to permit some degree of deformation (e.g., compression, bending, or stretching) of one or more walls 407, 409, so that the channel 416 can be temporarily widened while sliding the auxiliary optical device 400 onto a communication device 134, but at least a portion of one or more of the walls 407, 409 can be sufficiently stiff, rigid, or resilient to urge one or more of the plurality of walls 407, 409 to return to its original position and thereby exert a gripping force against a portion of the communication device, thereby providing a friction fit between the retainer portion 406 and the communication device 134. In some embodiments, a portion (or all) of the material of the retainer portion 406, especially the region on the inner side of the walls 407, 409 within the channel 416, can also be tacky or somewhat slide resistant to enhance the gripping of the retainer portion 406 to the communication device 134. In some embodiments, the gripping force and/or slide resistance can reduce or eliminate the need to attach a permanent or temporary mounting component to the communication device. For example, the lens component 400 can be repeatedly attached to and removed from a communication device 134 without requiring (though not prohibiting) installation on the communication device of a separate permanently or semi-permanently attached mounting component such as a bracket, magnet, adhesive, or other fastening component, thereby providing ease of installation while preserving the original overall shape, appearance, functionality, compatibility (e.g., with other communication devices or cases), and/or feel of the communication device when the lens component is removed.

As with any features, structures, steps, materials, or components disclosed and/or illustrated in this specification, any auxiliary optical device in this specification can be utilized with any type of mobile electronic communication device, including any of those illustrated and/or described in this specification. The mobile electronic communication device 134, as illustrated in FIGS. 2A-3C, includes at least one onboard camera 132 with a lens that is positioned in a flush or virtually flush relationship with the face of the mobile electronic communication device 134 in which it is embedded, and an onboard flash 136. In some embodiments, the onboard camera 132 or one or more components of the onboard camera 132, such as a lens and/or a protective metal ring can protrude or extend above or beyond the face of the mobile electronic communication 134.

Figure 1C:
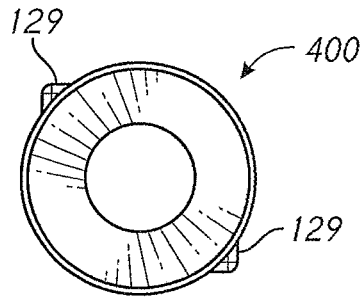
Figure 1D:
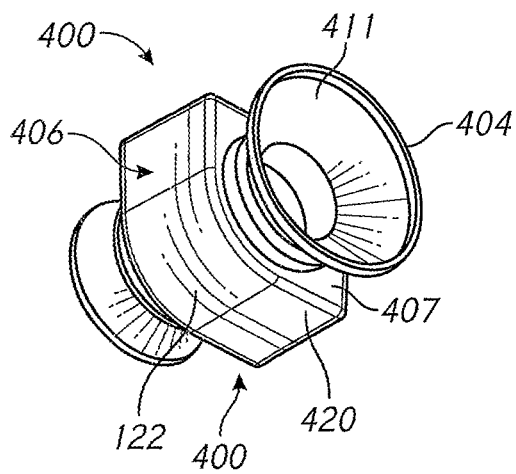
Figure 1E:
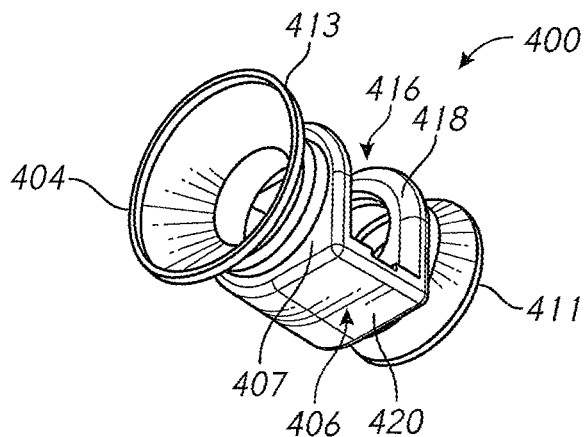

In some embodiments, the retainer portion 406 can comprise an upper wall 420 that can be shaped in some embodiments to generally correspond to the shape of one or more edges (e.g., side and/or top edges) of a communication device 134. As illustrated, the upper wall 420 has a generally curvilinear shape with a rounded corner 122. The retainer portion 406 can also include one or more internal surface features (e.g., recesses, protrusions, and/or contours, etc.) that are configured to generally avoid interference with one or more external features on a communication device 134. For example, as illustrated, a channel 424 can include a groove to avoid interference or inadvertent contact with a button or other feature on a communication device when the auxiliary optical device 400 is attached to the communication device 134. As illustrated in FIG. 1C, the sidewalls 407, 409 of the retainer 406 can comprise one or more generally pointed or angular regions 129.

In some embodiments, as illustrated, the retainer portion 406 can be configured to grip at least two nonparallel sides of a communication device 134. For example, the retainer portion 406 can contact at least a first generally vertical side or edge surface 133 of a communication device and at least a second generally horizontal and generally orthogonal side or edge surface 135 of a mobile communication device 134 (e.g., the lateral side and the top side of the mobile communication device) at the same time during use. In some embodiments, this contact by multiple generally perpendicular edges or surfaces permits repeatable adequately precise placement of the retainer portion 406. In some embodiments, only one edge is contacted or no edges are contacted. In some embodiments, the retainer portion, in any of a variety of configurations, can be attached to a mobile electronic communication device in a single attachment motion, without requiring user adjustment of the location or structure of the retainer portion and/or optical portion during attachment.

In some embodiments, two or more contacting surfaces in the retainer portion 406 can converge at an upper corner having a rounded external surface. In some embodiments, as illustrated, the retainer portion 406 is substantially smaller than the communication device to which it is configured to attach, or even substantially smaller than the viewing portion of the communication device to which it is configured to attach. In some embodiments, a retainer portion can be configured to contact only one side or edge (e.g., the generally vertical or the generally horizontal side or edge), such as by contacting both the front and rear surface of such side of edge but without also requiring contact with another side or edge. An example of such an embodiment can generally be formed from a retainer portion with a general U-shape comprising an upper wall, two side walls, and an opening on each side of the side walls. In some embodiments, a retainer portion can be configured to contact only one surface of the mobile electronic communication device, such as the surface of the mobile electronic communication device on which the onboard camera is located.

In some embodiments, the retainer portion 406 can permit the auxiliary optical device 400 to be removably attached to a communication device without requiring non-stock mounts on the communication device and without requiring dynamic mounts on the retainer portion 112 itself (e.g. fasteners, screws, adjustable clamps, etc.). For example, in some embodiments, a user can attach the auxiliary optical device 400 to a corner or some other location on a communication device by simply sliding it, for example, onto the corner or other location of the communication device, and can remove it by simply pulling it off, without requiring user adjustment during attachment. In some embodiments, as illustrated, the auxiliary optical device 400 can remain on the communication device 134 by way of a friction fit. The attachment to the communication device can avoid a residue deposit from adhesive, scratches to the exterior surface, or other damage or alteration of the communication device. In some embodiments, the retainer portion can be sufficiently wide and/or long so that it is adapted to receive an end and/or side region (e.g., two or more corners) of a communication device rather than merely one corner, and the other aspects of other embodiments disclosed herein can apply to such embodiments, including but not limited to the shape and materials of construction and the accomplishment of a friction fit between the retainer portion and the end and/or side region of a communication device. In some embodiments, the retainer portion can utilize dynamic mounts and/or any other means for attachment to a mobile electronic communication device. No means of attachment between an auxiliary lens system and a mobile electronic communication device should be deemed to be essential or indispensable to, or excluded by, this specification or any products herein.

The one or more lens portions 402, 404 generally comprises a transparent optical portion or lens 411, which is typically made of a glass or a polymer, and a securing structure 413. The term "lens" and similar terms should be understood in accordance with the customary meaning in this field, and includes at least any optical portion that permits light to pass through and provides some optical characteristic or protection, such as changing light direction, filtering light, and/or modifying one or more qualities of light that passes through the optical portion, etc. The securing structure 413 can be made of many different types of materials or combinations of materials, such as one or more metals (e.g., aluminum or steel) or one or more plastics. The securing structure 413 can include a generally wide-area opening for receiving the optical portion or lens 411 and a generally narrow-area region for attachment to the retainer portion 406. In some embodiments, the securing structure 413 and the retainer portion 406 can be configured to slide or otherwise move with respect to each other in a limited manner to allow for adjustment of the position of the optical portion or lens 402, 404 with respect to the onboard camera lens of a communication device (e.g., for the purpose of addressing manufacturing tolerances in the location of the onboard camera lenses in some communication devices). As illustrated, the mechanism or structure for attachment or securement of the optical portion or lens portion 411 to the retainer portion 406 can be separate from and/or can operate independently of the mechanism or structure for attachment or securement of the retainer portion 406 to the communication device. In some embodiments, as illustrated, the outside surface of the securing structure 413 can taper inwardly from the lens-receiving region to the retainer-attaching region to diminish the amount of material used in manufacturing and to diminish the size and weight of the auxiliary optical device 400. In some embodiments, the auxiliary optical device 400 can be very small, such as less than or equal to about 2½ inches or less than or equal to about 1½ inches across.

In some embodiments, as illustrated in FIGS. 1A-1E, the channel 416 includes an attachment-facilitating surface 418. In the illustrated examples, the attachment-facilitating surface 418 comprises an inwardly curved (e.g., sloped or slanted) surface positioned along the outer edge or slotted opening of the channel 416. In some embodiments, the attachment-facilitating surface 418 can be positioned at or near an outer edge of the channel 416. As illustrated, the attachment-facilitating surface can be thinner near the edge and can gradually become thicker as it progresses further into the channel 416.

As the lens component 400 is moved into an attachment position on a communication device, the attachment-facilitating surface 418 can provide an initial contact region or opening near the outer edge that is effectively wider to facilitate proper orientation and attachment of the device by a user, and a narrower second region further within the channel 416 (or further from the edge of the lens component 400), thereby providing a more secure attachment surface as the auxiliary optical device 400 is moved further onto the attachment region of the communication device 134. In some embodiments, as illustrated, the width of the channel 416 can change between the initial contact region and the second region in a smooth, gradual, and/or curvilinear manner. Some embodiments can include many other types of shapes. For example, the attachment-facilitating surface 418 can include a discontinuous surface or a series of discrete ramps, protrusions, or grooves. As with any other features, structures, steps, methods, or components illustrated and/or described in this specification, the attachment-facilitating surface 418 can be included on any embodiment of an auxiliary optical device.

As illustrated in FIGS. 2A and 3C, the user can select which of the plurality of lenses 402, 404 to position in front of the camera 132 of the communication device 134 to achieve a desired photographic affect. In FIG. 2B, the lens component 400 is moved into an attachment position on a communication device 134 such that a first (e.g., smaller-diameter) lens 402 is positioned in front of the onboard camera lens 132 and a second (e.g., larger-diameter) lens 404 is positioned on an opposite side of the communication device 134. In this orientation, the smaller-diameter lens 402 is operative and the larger-diameter lens 404 is not operative. In FIGS. 3A-3C, the lens component 400 is removed from the communication device, rotated about a vertical axis (e.g., approximately 180° in this example), and rotated about a horizontal axis to orient the channel 416 in general alignment with an attachment surface (e.g., a housing edge) of the communication device. In FIG. 3C, the auxiliary optical device 400 is again advanced onto the communication device 134 such that the second optical component (e.g., the larger-diameter lens 404) is positioned in front of the onboard camera lens 132 and the first optical component (e.g., the smaller-diameter lens 402) is positioned on an opposite side of the communication device 134. In this orientation, the larger-diameter lens 404 is operative and the smaller-diameter lens 402 is not operative. In some embodiments, this configuration of a lens component 400 can conveniently permit multiple lens options without necessarily requiring the user to hold or store multiple discreet lens components. In some embodiments, more than two lens types or features can be included in the lens component 400, thereby providing the user with many lens options.

In the illustrated examples, though not in every embodiment, the first and second optical components 402, 404 are not in optical communication with each other, and only one of the optical components 402, 404 is in optical communication with a particular onboard camera 132 at the same time. The particular optical component 402 or 404 that is in optical communication with the onboard camera 132 is configured to receive light that is impinging upon the surface of the mobile electronic device in which the onboard camera 132 that in optical communication with the optical component 402 or 404 is located.

Any of the foregoing features, steps, structures, methods, or components, and/or anything else disclosed and/or illustrated in U.S. Pat. No. 8,279,544, which is incorporated herein by reference in its entirely for all that it discloses, can be used with or instead of any features, steps, structures, methods, or components disclosed and/or illustrated elsewhere in this specification. For example, any retainer pOrtion disclosed below in this specification can be configured to attach to any optical component or lens described and/or illustrated above, and/or any feature of any retainer portion disclosed below in this specification can be combined with any retainer portion 400 (or any feature thereof) that is described and/or illustrated above, and/or any method of attaching a retainer portion to a mobile electronic communication device (or any step thereof) described and/or illustrated above can be used in any of the embodiments described and/or illustrated below, etc. Any other combinations of features can be used.

FIGS. 4A and 4B show an example of a removably attachable auxiliary optical device 500 configured to maintain a parallel or substantially parallel orientation of a particular surface of the auxiliary optical device 500 with respect to a face of a mobile electronic device to which the auxiliary optical device 500 is removably attached. As used in this specification, the term "substantially parallel" refers to an orientation that is sufficiently close to parallel to achieve acceptable optical performance in a consumer optical device, and in some embodiments includes deviations that are less than or equal to about 10 degrees from parallel. For each reference to or use of the term "parallel" in this specification, it should be understood that "substantially parallel" is also contemplated and deemed to be disclosed herein for such reference or use, even when it is not always repeated verbatim for brevity. In some embodiments, as illustrated, the removably attachable auxiliary optical device 500 may include a retainer portion 502, a mount or mounting portion 514, and an optical portion 510. The retainer portion 502 may include a first sidewall 504 and a second sidewall 506. An upper wall may extend between the first and second sidewalls 504 and 506. The first and second sidewalls 504 and 506 may form a channel 508 configured to receive a corner or edge of a mobile electronic device. Although the auxiliary optical device 500 is shown having only one optical portion 510, in some embodiments the auxiliary optical device 500 may include multiple (e.g., two or more) optical portions 510. For example, the auxiliary optical device 500 may include two optical portions 510, one mounted or mountable to mounts or mounting portions 514 on each of the first and second sidewalls 504 and 506. In this configuration, the auxiliary optical device 500 may provide optical portions 510 for both a user-facing camera and an outward-facing camera of a mobile device simultaneously, as described in greater detail above and shown in FIGS. 1A-3C. As another example, the auxiliary optical device may include two or more optical portions 510 mounted or mountable to a single mount or mounting portion 514 of a single sidewall 504 and/or 506. In this configuration, the auxiliary optical device 500 may provide optical portions 510 for each of multiple camera lenses positioned on a single face of a mobile device.

In some embodiments, one or more mounts or mounting portions 514 may be coupled to or integrated with the retainer portion 502 such that the mounting portion(s) 514 can move with respect to the retainer portion 502 and the sidewalls 504 and/or 506. A mounting portion 514 may achieve or maintain a parallel orientation with respect to a face of a mobile electronic device even when a sidewall 504 and/or 506 of the retainer portion 502 is not in a parallel orientation with respect to the face of the mobile electronic device. In this way, an optical axis of an optical portion 510 mounted to the mounting portion 514 may be positioned co-axial or parallel with an optical axis of an onboard camera of the mobile device even when a sidewall 504 or 506 is not in a parallel orientation with respect to the face on which the onboard camera lens is located.

For example, as shown in FIG. 4A, the retainer portion 502 may be sized and/or shaped to receive, in the channel 508, a corner or edge of a mobile device 134a having a thickness 520a. In this example, the distance between the first and second sidewalls 504 and 506, corresponding to the width of the channel 508, may be substantially the same or slightly smaller than the width 520a of the mobile device 134a. Thus, the retainer portion 502 can secure the auxiliary optical device 500 to the mobile device 134a, as described in greater detail above with respect to FIGS. 1A-3C. When secured to the mobile device 134a as shown, the retainer portion 502 can position the optical portion 510 such that the optical axis of the optical portion 510 is co-axial or substantially parallel with the optical axis of an onboard camera lens on a corresponding face 138a of the mobile device 134a.

As shown in FIG. 4B, the same auxiliary lens device 500 can also be installed on a different mobile device 134b having a larger thickness 520b (or on the same mobile device 134a that is now thicker, such as after installation of screen protector or protective case onto the mobile device 134a) without creating optical distortion or degrading optical performance and/or while maintaining essentially the same optical capabilities. For example, as shown in FIGS. 4A and 4B, the optical centerline of the optical component can be maintained in essentially the same orientation (e.g., essentially perpendicular to a face of the mobile electronic device with an onboard camera) when attached to both the thinner and thicker mobile electronic devices. As shown, the channel 508 between the first and second sidewalls 504 and 506 may be widened so that a corner or edge of the mobile device 134b may be received within the channel 508. However, because the portion of mobile device 134b received within the channel 508 is thicker than the portion of mobile device 134a received within the channel 508, the sidewall 506 may not be able to maintain a parallel orientation with respect to a corresponding face 138b of the mobile device 134b. For example, the interior surface of the sidewall 506 facing the mobile device 134b may form an acute angle with respect to the corresponding surface 138b of the mobile device 134b, as shown in FIG. 4B. In contrast, the interior surface of sidewall 506 may have been substantially parallel to (or may have formed a smaller angle with) the face 138a of the mobile device 134a shown in FIG. 4A due to the smaller thickness 520a of the mobile device 134a. One problem, among others, with the differing orientations of the sidewall 506 with respect to faces of mobile devices is that the differing orientations of the sidewall 506 can make it difficult to consistently align the optical axis of the optical portion 510 with the optical axis of an onboard camera lens. For example, the optical axis of the optical portion 510 may be generally orthogonal (e.g. set at a 90 degree angle) with respect to the sidewall 506 with the sidewall 506 is in a default or unstressed state. The optical axis of an onboard camera of a mobile device may be generally orthogonal with respect to a face of the mobile device. Thus, any non-parallel orientation of the sidewall 506 with respect to a corresponding face of the mobile device may cause misalignment of the optical axes of the optical portion 510 and the onboard camera lens.

As shown in FIG. 4B, by mounting or integrating the optical portion 510 with a movable mounting portion 514, the optical axis of the optical portion 510 may be aligned co-axial with—or parallel or substantially parallel to—the optical axis of the of the onboard camera lens even when the sidewall 506 is not parallel with the corresponding face 138b of the mobile device 134b. The mounting portion 514 may be coupled to the retainer portion 502 at one or more points 512. The mounting portion 514 can rotate or pivot or otherwise move with respect to the point(s) 512 such that the mounting portion 514 can achieve and maintain a parallel orientation with respect to the faces 138a, 138b of various mobile devices 134a, 134b having various thicknesses 520a, 520b. For example, as described in greater detail below with respect to FIGS. 5-9, the mounting portion 514 may be coupled to or integrated with the retainer portion such that the mounting portion 514 can pivot or rotate around an axis that is substantially parallel with respect to the faces 138a, 138b of the mobile devices onto which the optical device 500 is installed.

In some embodiments, a separate mounting portion 514 may be coupled to or integrated into each of the sidewalls 504 and 506 so that there are multiple (e.g., two or more) mounting portions 514 and multiple optical portions 510 on a single auxiliary optical device 500. In some embodiments, multiple optical portions 510 may be mounted to or integrated with a single mounting portion 514. For example, two optical portions 510 may be mounted to a single mounting portion 514 such that each optical portion 510 can be used with a different onboard camera lens on mobile devices that have multiple onboard camera lenses on a single face. As another example, two optical portions 510 may be mounted to a single mounting portion 514 such that the optical portions 510 can be selectively used with a single onboard camera lens.

As with all embodiments in this specification, any feature, structure, step, material, or component that is illustrated and/or described with respect to FIGS. 4A and 4B can be used with any feature, structure, step, material, or component that is illustrated or described throughout the present specification.

With reference to FIGS. 5-9, examples of a removably attachable auxiliary optical device 500 and its component parts are illustrated in many different views. As shown, a mounting portion 514 may have one or more coupling portions 544. The coupling portions 544 may be configured to interface with one or more corresponding coupling portions 550 of a sidewall of the retainer portion 502.

Figure 6:
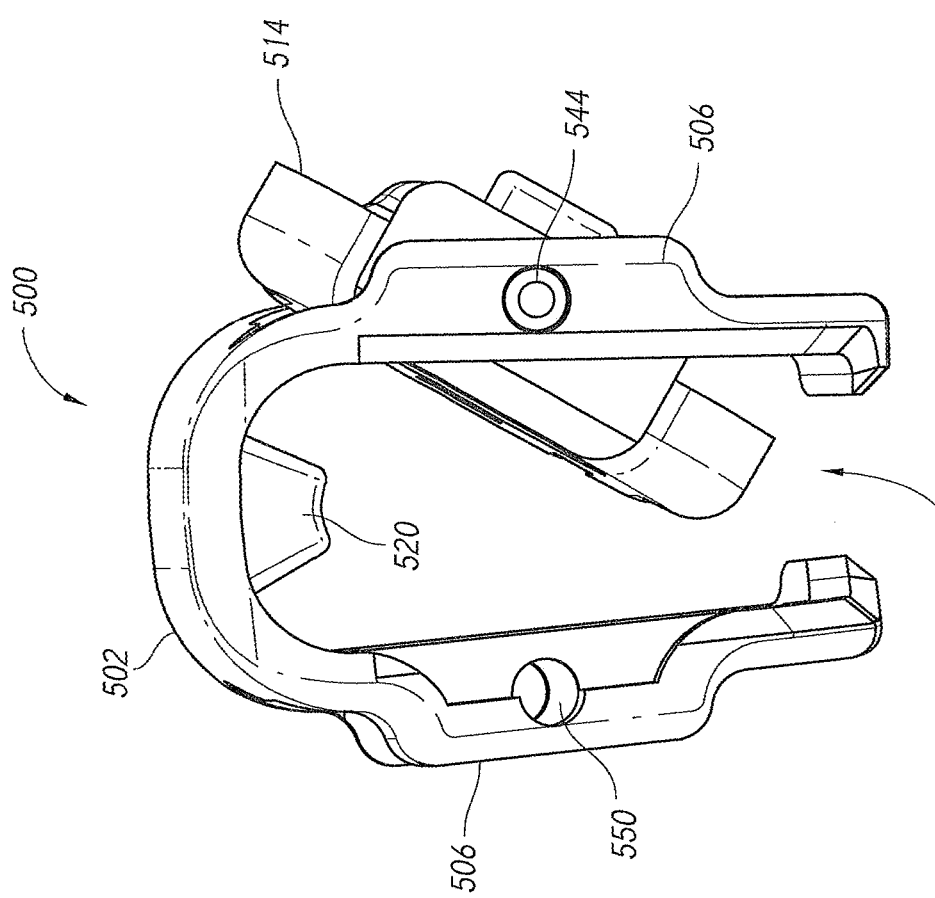
FIG. 6 illustrates an example of the auxiliary optical system of FIGS. 4A and 4B in which a mount or mounting portion is in a non-parallel orientation with respect to a sidewall of the auxiliary optical system.
Figure 7:
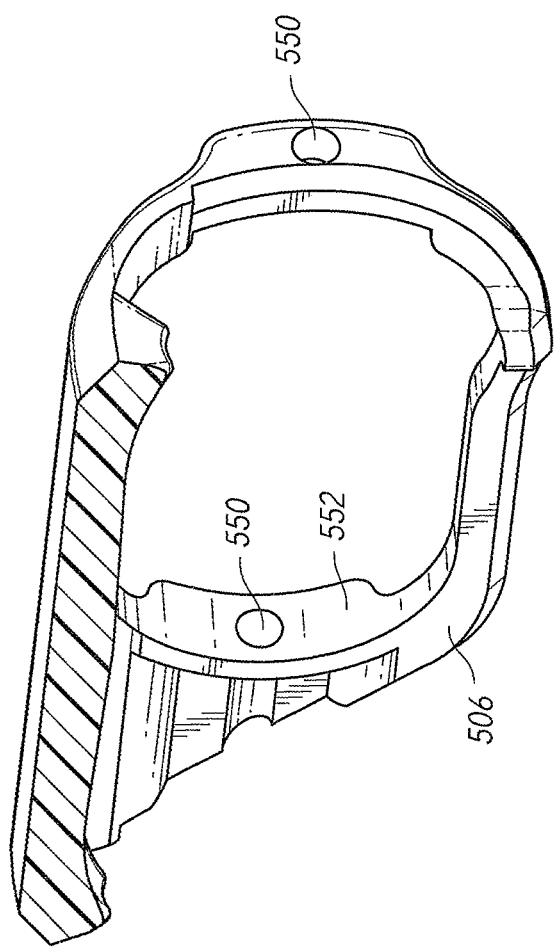
FIG. 7 illustrates a cutaway of the auxiliary optical system of FIGS. 4A and 4B showing where a mount or mounting portion may be coupled to the auxiliary optical system.
Figure 8:
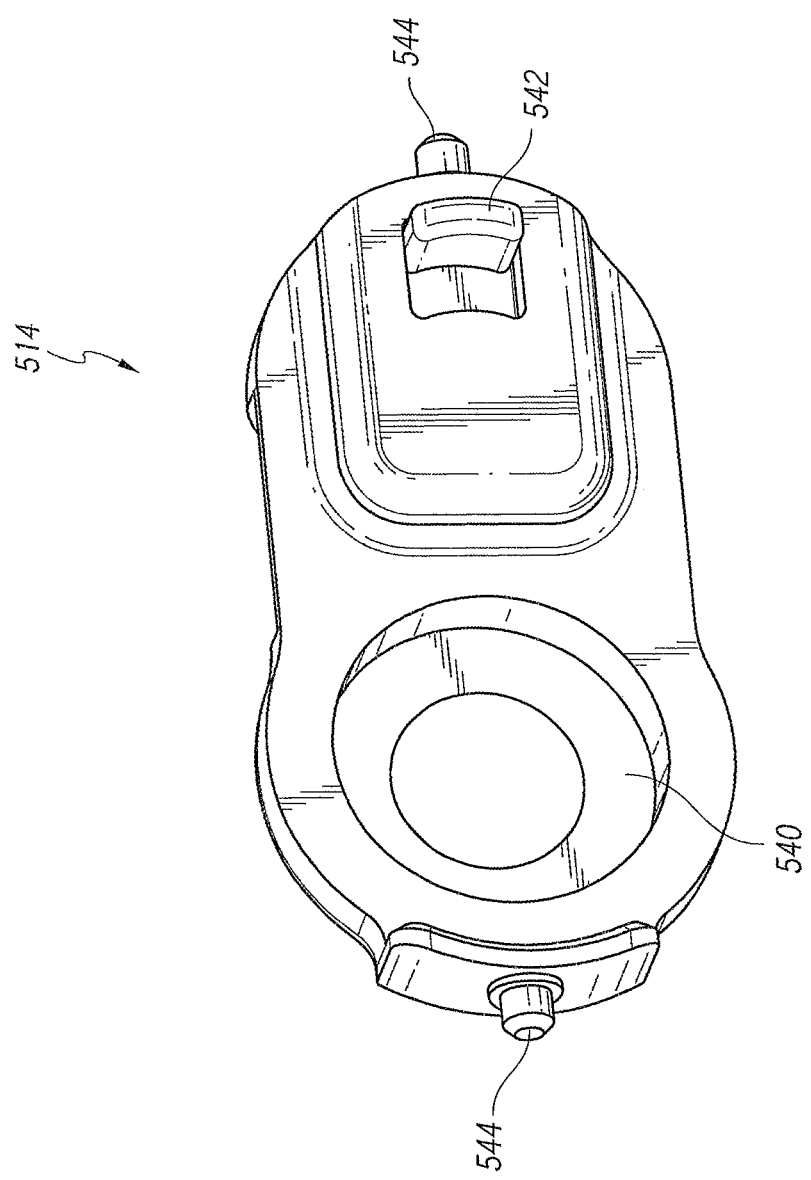

In some embodiments, a sidewall 506 may have two recessed or hollow coupling portions 550 configured to receive protruding coupling portions 544 of a mounting portion 514. The coupling portions 544 of the mounting portion 514 may be oriented such that they form an axis. The mounting portion 514 may rotate or pivot around the axis or otherwise move when the mounting portion 514 is coupled to the side wall 506. For example, first and second coupling portions 544 may be tabs, rods, or other protrusions that extend outward from the mounting portion 514 in substantially opposite directions. The sidewall 502 may have an interior edge 552 defining an aperture within which a mounting portion 514 may be placed. First and second coupling portions 550 may be holes, hollows, or other recesses extending from the surface the edge 552 to below the surface of the edge 552, and may receive corresponding first and second coupling portions 544 extending outward from the mounting portion 514. As shown in FIG. 6, the mounting portion 514 may then rotate or pivot at least partially around an axis that is formed by the first and second coupling portions 544. For example, the mounting portion 514 can be moveable into a position in which the mounting portion 514, or a surface of the mounting portion 514 that is configured to contact a face of the mobile electronic device, is non-planar with respect to either or both of the sidewalls 504, 506, as illustrated in FIG. 6 and FIG. 4B. In some embodiments, the mounting portion 514 may have one or more recessed coupling portions instead of, or in addition to, protruding coupling portions, and edge 522 may have one or more protruding coupling portions instead of, or in addition to, recessed coupling portions.

In some embodiments, the mounting portion 514 may be removable. For example, the mounting portion 514 may be removed from the retainer portion 502 and replaced by another mounting portion 514 and/or installed into another retainer portion 502. Each mounting portion 514 may include an optical portion 510, such as a lens, coupled to the mounting portion 514 in an optical region 540. Some mounting portions 514 may have optical portions 510 permanently or semi-permanently attached to the mounting portions 514, such as lenses having various optical properties. If a user wishes to change the optical effect used at a particular time, the user may remove the mounting portion 514 and corresponding optical portion 510, and install a different mounting portion 514 and corresponding optical portion 510 into the optical device 500. A mounting portion 514 may have an actuator 542, such as a lever or a button, that facilitates removal of the mounting portion 514 from the retainer portion 502. For example, a user may use the actuator to retract a coupling portion 544 out of the corresponding coupling portion 550 of the side wall 506 so that the mounting portion 514 can be removed.

Some mounting portions may have optical regions 540 that allow different optical portions 510 to be removably attached to mounting portion 514. If a user wishes to change the optical effect used at a particular time, the user may remove an optical portion 510 from the mounting portion 514, and install a different optical portion 510. For example, the optical region 540 may be or include a threaded recess, a bayonet mount, or the like. An optical portion 510 may have a corresponding region, such as complementary threads, a complementary bayonet mounting component, or the like.

FIG. 9 shows a view of an interior surface of a mounting portion 514 (e.g., the surface that contacts the face 138 of the mobile device). As shown, the interior surface may have an onboard camera lens receiving region 546. The onboard camera lens receiving region 546 may be sized and/or shaped to be generally complementary to the size and/or shape of an onboard camera lens of a mobile device 134. For example, a mobile device 134 may have a protruding onboard camera lens, or a raised structure extending from the surface 138 and partially or completely surrounding the onboard camera lens. The raised structure may be a cylindrical ring, a conical structure, a frustum-shaped structure, a frusto-conical structure, etc. The onboard camera lens receiving region 546 may have a complementary shape to receive the raised structure. In addition, the interaction between the raised structure and the onboard camera lens receiving region 546 may aid in aligning and/or securing the optical device 500 on the mobile device 134. In some embodiments, users may remove and replace mounting portions 514 in order to use the same auxiliary optical device 500 with different mobile devices 134 having different surface contours, camera lens configurations, etc. In some embodiments, the interior surface of the mounting portion 514 may be substantially flat in the area that contacts or is positioned adjacent to the onboard camera lens of a mobile device 134, such as when the onboard camera lens does not protrude and there is no protruding structure near the lens.

In some embodiments, the interior surface (e.g., the surface that contacts the face 138 of the mobile device) of a mounting portion 514 may include one or more securement surfaces 548 that aid in securing the auxiliary optical device 500 to the mobile device 134. For example, a spring or other resilient structure may be below the interior surface of the mounting portion 514 and may exert a force against the mobile device 134. As another example, the interior surface may include a portion that is resilient or provides an increased coefficient of friction to aid in securing the auxiliary optical device 500 to the mobile device 134.

FIG. 10 shows an interior surface of another mounting portion 514 (e.g., the surface that contacts the face 138 of the mobile device). The interior surface may have an onboard camera lens receiving region 562 that provides a water-resistant seal between the auxiliary optical device 500 and the mobile device 134. For example, the onboard camera lens receiving region 562 may be a gasket or ring or suction cup (or may be coupled to a suction cup) that contacts the mobile device on, around, or near the onboard camera lens and forms a water-resistant seal. In some embodiments, a mounting portion 514 may include one or more alignment structures (not shown) instead of, or in addition to, a camera lens receiving region 562. The alignment structures may extend away from the surface of the mounting portion 514 and toward the onboard camera lens or lenses. The alignment structures may contact an onboard camera lens (or a region adjacent to or substantially close to the onboard camera lens or lenses), causing the mounting portion 514 to rotate or pivot with respect to the onboard camera lens rather than a surface of the mobile device. In this way, the mounting portion 514 (and any optical portion coupled thereto) may be directly aligned with the onboard camera lens, in whole or in part, providing a more accurate alignment in situations where the onboard camera lens is angled slightly with respect to a surface of the mobile device.

In some embodiments, as shown, the mounting portion 514 may include one or more adjustment structures 564. The adjustment structures 564 may provide spacing between the mounting portion 514 (or portions thereof) and the mobile device 134, or they may provide an adjustable fit. For example, the adjustment structures 564 may be threaded (e.g., screws), and may retract into and/or extend out of the surface of the mounting portion 514 depending upon the degree to which the adjustment structures are 564 are "screwed" into or out of the mounting portion 514. The adjustment structures 564 may be extended farther out of the mounting portion 514 to provide a tighter fit for the auxiliary optical device 500 on the mobile device, or the adjustment structures may be retracted into the mounting portion 514 to provide a looser fit (or to accommodate mobile devices of varying thicknesses, mobile devices onto which screen protectors or protective cases have been installed, etc.). In some embodiments, instead of or in addition to the adjustment structures 514, the mounting portion 514 may include a securement surface 560 that aids in securing the auxiliary optical device 500 to the mobile device 134. For example, a spring or other resilient structure may be positioned below the securement surface 560 and may exert a force against the mobile device 134. As another example, the securement surface 560 may include a portion that is resilient or compressible or provides an increased coefficient of friction to aid in securing the auxiliary optical device 500 to the mobile device 134.

Figure 11:
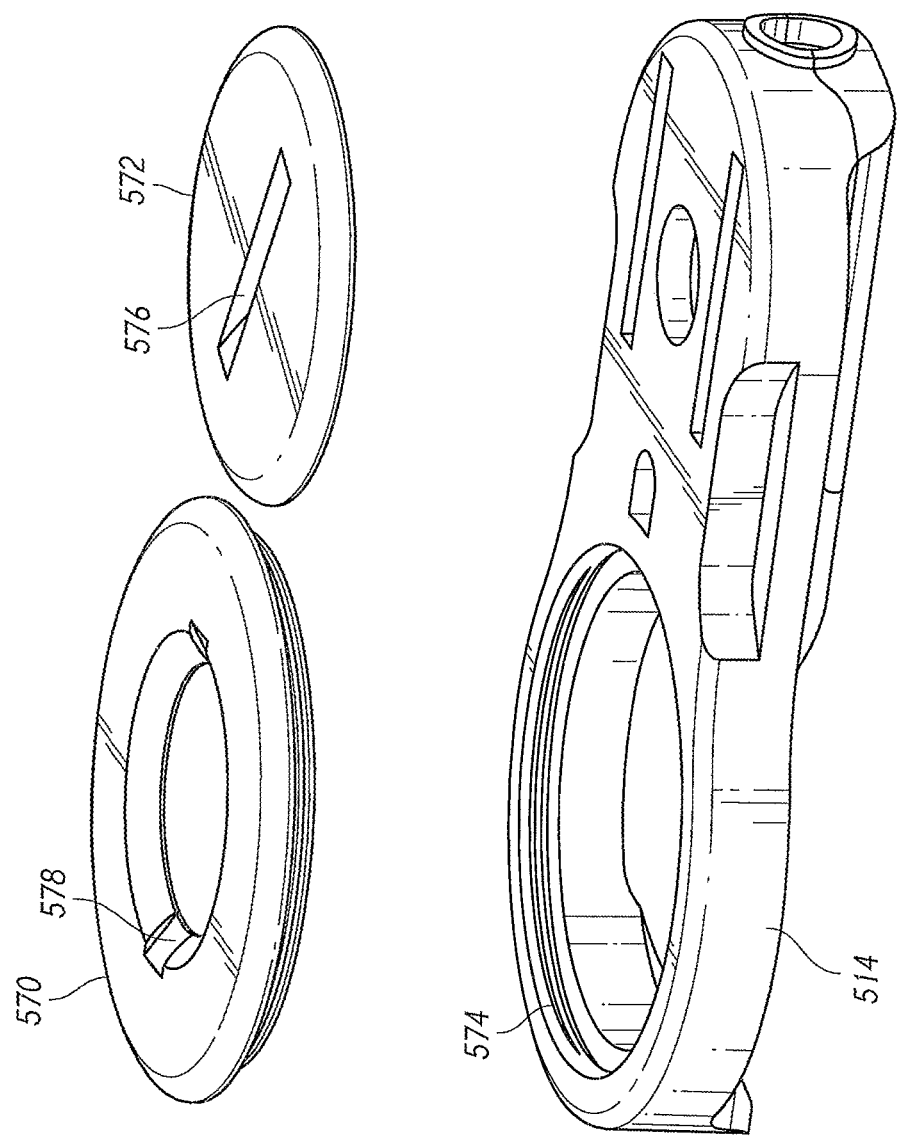
FIG. 11 illustrates another example of a mount or mounting portion that may be configured to achieve a parallel orientation with respect to the surface of a mobile device.

FIG. 11 shows another mounting portion 514 that may be used with a retainer portion 502 of an auxiliary optical device 500. The mounting portion 514 shown in FIG. 11 includes removably attachable contact components, such as spacers 570 and 572. The spacers 570 and 572 can aid in aligning and securing the auxiliary optical device 500 on a mobile device 134. For example, a particular spacer may provide a tight fit by extending away from the surface of the mounting portion 514. A different spacer may extend a smaller distance away from the surface of the mounting portion 514, and may therefore provide a looser fit or allow the auxiliary optical system 500 to be installed on a thicker mobile device (or on a mobile device with a protective case or a screen protector, etc.). Yet another spacer may not extend away from the surface of the mounting portion 514 at all, or may be at least partly recessed into the mounting portion 514, to avoid interfering with a portion of the mobile device or to receive a protruding structure of the mobile device (e.g., a raised ring around an onboard camera lens). Some spacers may both extend away from a surface of the mounting portion and also be at least partially recessed below the surface of the mounting portion 514.

In some embodiments, as shown, a spacer 570 may be removably attached to a mounting portion via an attachment region, such as the threaded portion 574 of the mounting portion 514 shown in FIG. 11. The spacers 570 and 572 may include interface regions 578 and 576 to allow users to attach, remove, and adjust the spacers 570, 572. For example, the interface regions 578 and 576 may be slots or notches into which a user may insert a coin, key, or some other tool that facilitates rotation of the spacers 570 and 572.

Figure 12:
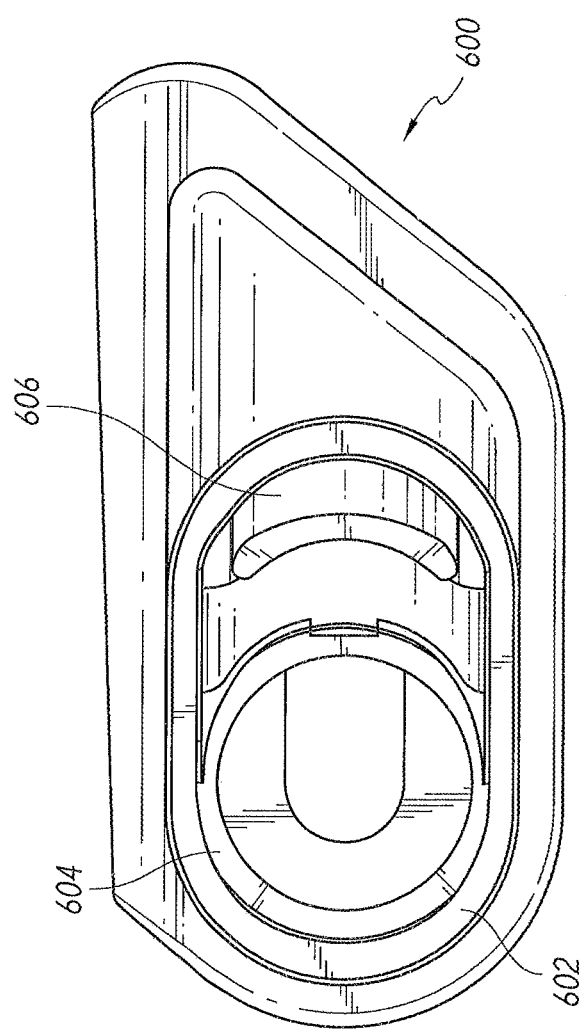
FIGS. 12 and 13 illustrate different views of an example of an auxiliary optical system that may be used with mobile devices having multiple onboard camera lenses.
Figure 13:
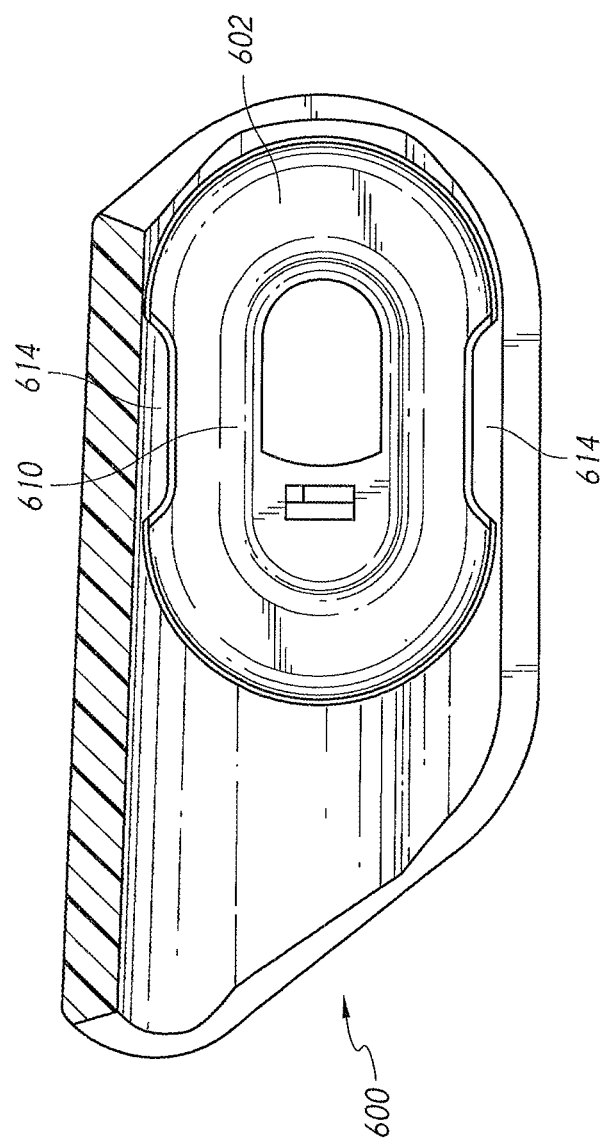

FIGS. 12 and 13 show another example of a removably attachable auxiliary optical device 600 configured to maintain a parallel or substantially parallel orientation of a particular surface of the auxiliary optical device 600 with respect to a face of a mobile electronic device. FIG. 12 shows an exterior surface of the auxiliary optical device 600, and FIG. 13 shows an interior surface of the auxiliary optical device 600. The auxiliary optical device 600 may include an illumination region 606. The illumination region 606 may be an open or clear or substantially translucent region through which light is permitted to pass. For example, the illumination region 606 may be positioned over, or aligned with, a flash photography component of a mobile device onto which the auxiliary optical device 600 is installed. The illumination region 606 can convey light (or otherwise allow light to pass) from the flash photography component to an area in front of the mobile device, thereby illuminating a photographic subject. In some embodiments, the illumination region 606 may alter the light that is conveyed or passed. For example, the illumination region 606 may alter the color of the light, diffuse the light, focus the light, etc.

Figure 5:
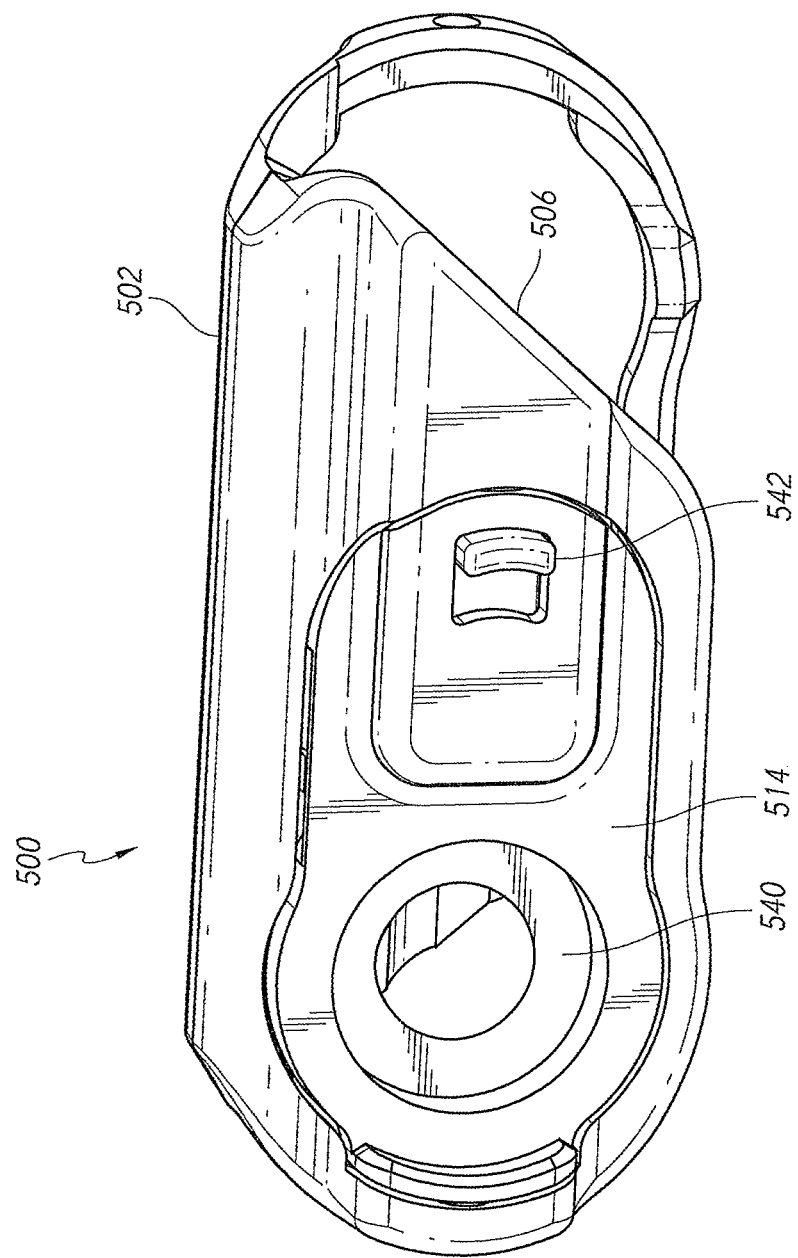
FIG. 5 illustrates an example of the auxiliary optical system of FIGS. 4A and 4B in which a mount or mounting portion is in a parallel orientation with respect to a sidewall of the auxiliary optical system.

The auxiliary optical device 600 shown in FIGS. 12 and 13 may be similar in many respects to the auxiliary optical device 500 shown in FIGS. 5 and 6. For example, the auxiliary optical device 600 may include one or more mounting portions 602 that can rotate or pivot with respect to the auxiliary optical device 600 in order to maintain a parallel or substantially parallel orientation with respect to a face or other surface of the mobile device 134. In some embodiments, the mounting portion 602 may be coupled to the auxiliary device 600 such that the mounting portion 602 may move or pivot on multiple axes. For example, the mounting portion 602 may be coupled to the auxiliary optical device 600 using a gimbal structure in order to allow multiple axes of compensation for the expansion and contraction of the auxiliary optical device on mobile devices of different thicknesses, as described herein. The mounting portion 602 may also include an onboard camera lens receiving region 610. The onboard camera lens receiving region 610 may be sized and/or shaped to be generally complementary to the size and/or shape of an onboard camera lens of a mobile device 134

Figure 14C:
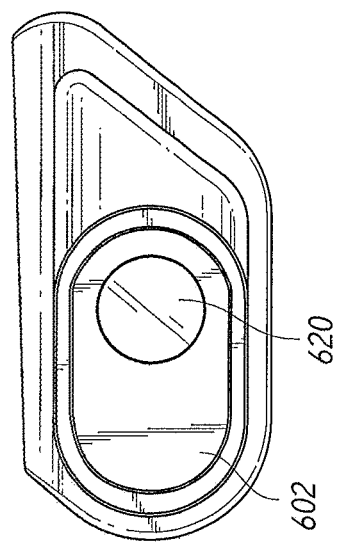
FIGS. 14A, 14B, and 14C illustrate a mount or mounting portion that may be removed from a retainer portion of an auxiliary optical system, re-oriented, and reattached to the retainer portion.
Figure 14B:
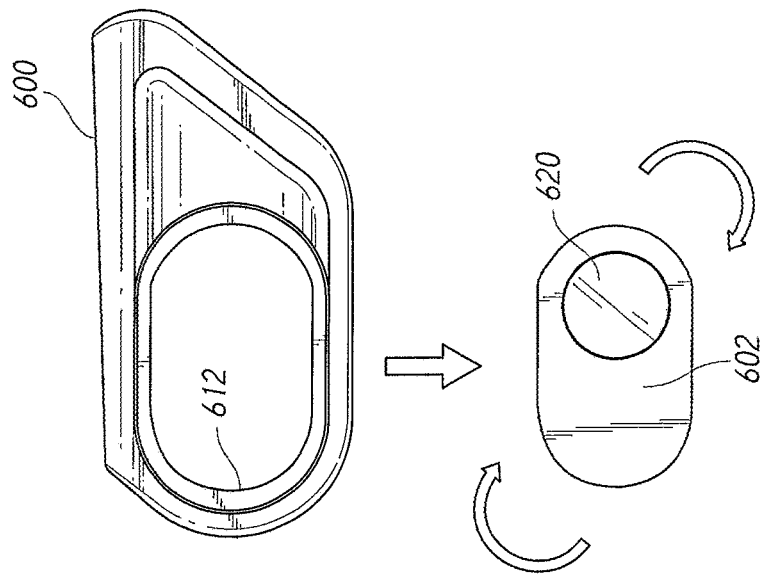
Figure 14A:
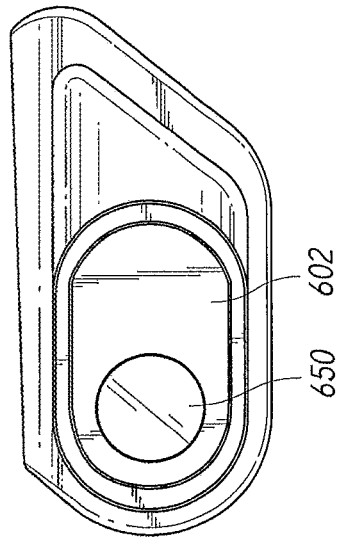

Whereas the mounting portion 514 shown in FIGS. 5 and 6 may be asymmetrical and/or keyed to the opening in the retainer portion 502 in which the mounting portion 514 is inserted, the mounting portion 602 shown in FIGS. 12 and 13 may be substantially symmetrical, such as about a generally vertical axis and/or a generally horizontal axis. Thus, the mounting portion 602 may be removed, rotated, and then re-installed in the retainer portion of the auxiliary optical device 600. The ability to remove, rotate, and re-install a mounting portion 602 into an auxiliary optical device 600, as shown in FIGS. 14A-14C, can allow the mounting portion (and an optical portion installed or integrated therein, such as a lens) to be aligned with each of two different onboard camera lenses of a mobile electronic device 134. For example, a mobile electronic device, such as the iPhone 7 Plus manufactured by Apple, may have two different onboard camera lenses positioned relatively close to each other. An optical portion 620, such as a lens, may be coupled to the mounting portion 602 in an optical region 604. When the mounting portion 602 is installed in a receiving region 612 of the auxiliary optical device 600 in a first position, shown in FIG. 14A, the optical portion 620 may be placed in optical alignment with a first onboard camera lens of the mobile device. A user may remove and rotate the mounting portion 602 as shown in FIG. 14B, and reattach the mounting portion 602 in the auxiliary optical device 600 in a second position, as shown in FIG. 14C. In the second position, the optical portion 620 may be in optical alignment with a second onboard camera lens of the mobile device.

In some embodiments, as shown in FIG. 13, the auxiliary optical component 600 may include one or more movement inhibitors 614. The movement inhibitors may prevent over rotation of the mounting portion 602 with respect to the auxiliary optical device 600. For example, a rotation of up to and including about 1 degree, up to and including about 2 degrees, or up to and including about 5 degrees may be enough to allow a mounting portion 602 to maintain a parallel orientation with a face of a mobile device. The movement inhibitors 614 may be configured to restrict the rotation of the mounting portion 602 to a maximum angle, such as any of the foregoing maximum angles. By restricting movement in this way, the auxiliary optical component 600 may be installed on a mobile device without requiring manual adjustment of a mounting portion (e.g., without requiring the user to rotate the mounting portion out of the channel in the retainer portion of the auxiliary optical device during attachment of the mounting portion to a mobile communication device, as may be the case with the exaggerated rotation shown in FIG. 6).

Figure 15:
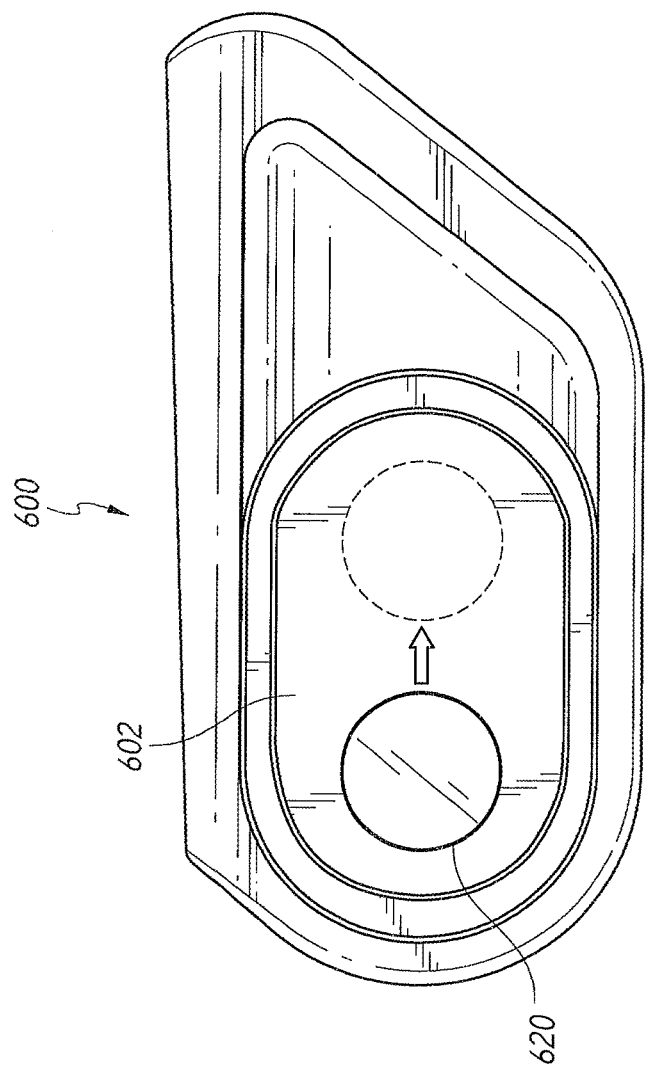
FIG. 15 illustrates another example of an auxiliary optical system in which an optical component may be positioned in optical alignment with multiple different onboard cameras of a mobile device.
Figure 16:
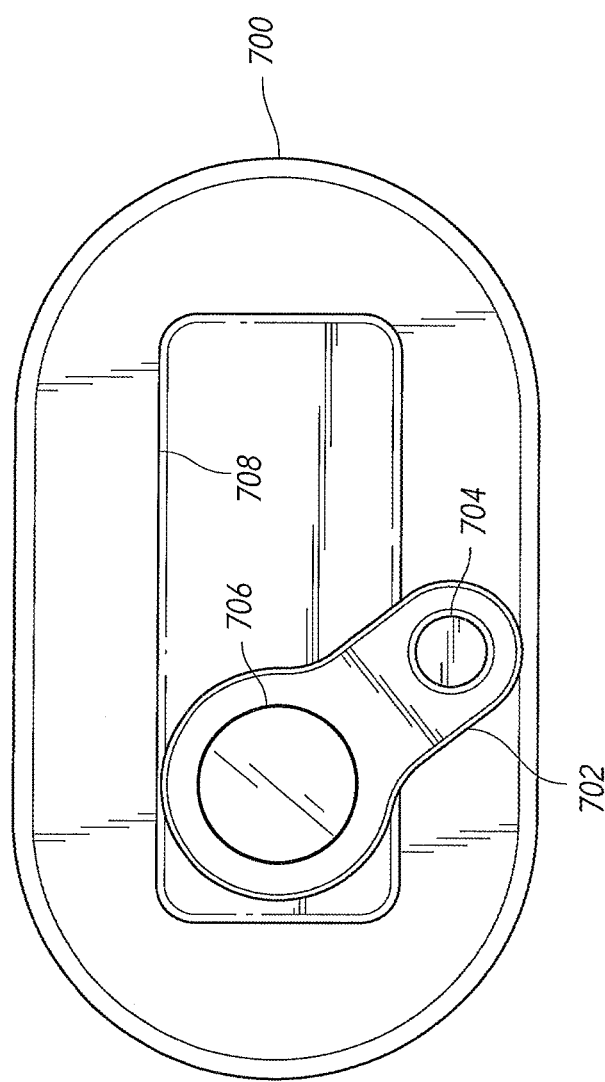
FIG. 16 illustrates a mount or mounting portion in which an optical component may be positioned in optical alignment with multiple different onboard cameras of a mobile device.

FIG. 15 shows another example of an auxiliary optical device 600 with a mounting portion 602 that allows an optical portion 620 to be placed in multiple positions. In the example shown in FIG. 15, the optical portion 620 can be moved from a first position, in which the optical portion 620 is in optical alignment with a first onboard camera lens of a mobile device, to a second position in which the optical portion 620 is in optical alignment with a second onboard camera, without removing the mounting portion 602 from the auxiliary optical device 600. In some embodiments, a mounting portion 602 or some component thereof may be secured to the auxiliary optical system 600 on one or more tracks or rails. The mounting portion 602 or some component thereof may then be urged (e.g., "slid" or "switched") from the first position to the second position, and vice versa. In some embodiments, multiple optical portions 620 can be provided in a single mounting portion 602 and/or in a single auxiliary optical device 600 on the same side of the mounting portion 602 and/or of the auxiliary optical device 600, at the same time, so that each optical portion 620 is in optical alignment or optical communication with one of a plurality of onboard cameras on the mobile communication device to which the auxiliary optical device 600 is removably attached. For example, a single auxiliary optical device 600 and/or a single mounting portion 602 can provide one or more auxiliary optical features FIG. 16 shows an example of another mounting portion 700 that allows an optical portion 706 to be placed in multiple positions. In the example shown in FIG. 16, the optical portion 706 can be coupled to or integrated with a pivoting member 702. An aperture 708 in the mounting portion 700 can provide access to one or more onboard camera lenses and/or other components of a mobile device. The pivoting member 702 can pivot at a pivot point 704 from a first position, in which the optical portion 706 is in optical alignment with a first onboard camera lens of the mobile device, to a second position in which the optical portion 706 is in optical alignment with a second onboard camera. In some embodiments, the mounting portion 700 can be mounted in an auxiliary optical system 500 or 600, described above, a protective case 910, described below, or the like.

Figure 17:
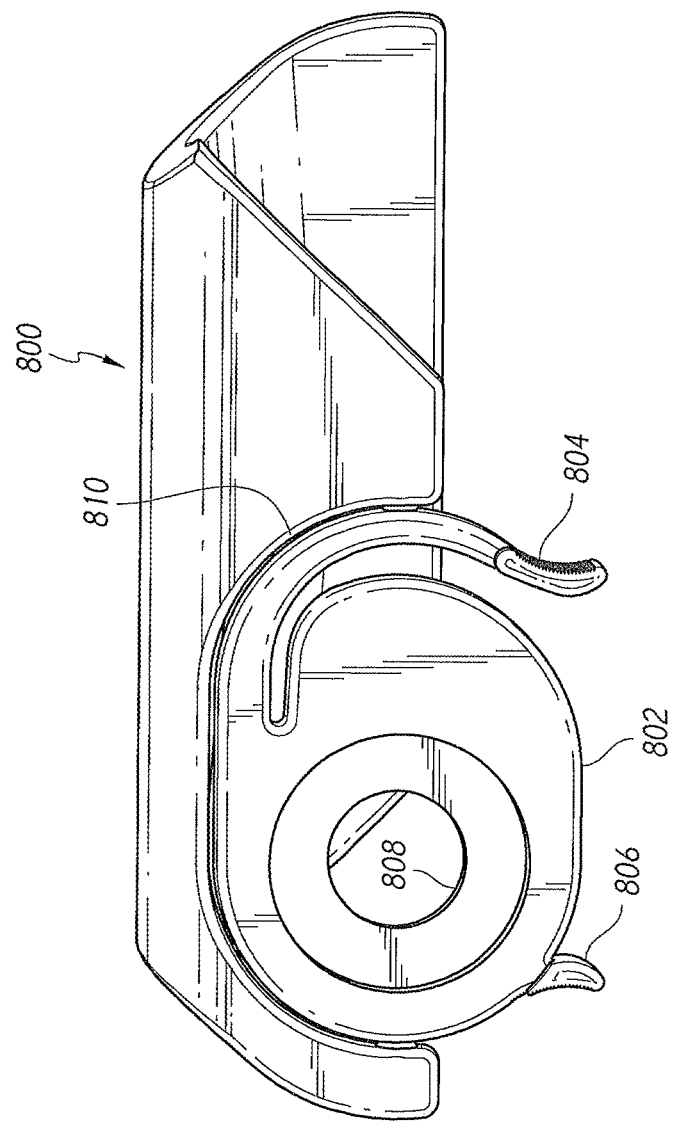
FIG. 17 illustrates an example of a mount or mounting portion that may be removably attached to a retainer portion of an auxiliary optical system.

FIG. 17 shows another example of an auxiliary optical device 800 with a removably attachable mounting portion 802. In the example shown in FIG. 17, the mounting portion 802 can be coupled to the auxiliary optical device 800 at a coupling region 810. One or more resilient securement members 804 can be used to secure the mounting portion 802 to the coupling region 810. For example, a securement member 804 may be biased away from the body of the mounting portion 802 and towards the coupling region 810. The securement member 804 may contact the coupling region 810 and secure the mounting portion 802 to the coupling region 810 via insertion of a protrusion (not shown) into a recess of the coupling region 810, receipt of a protrusion (not shown) of the coupling region 810 in a recess in the securement member 804, or some other method. In some embodiments, a user may urge the securement member 804 away from the coupling region 810 by gripping or squeezing the securement member 804 towards member 806, thereby disengaging mounting portion 802 from the auxiliary optical device 800.

Figure 18:
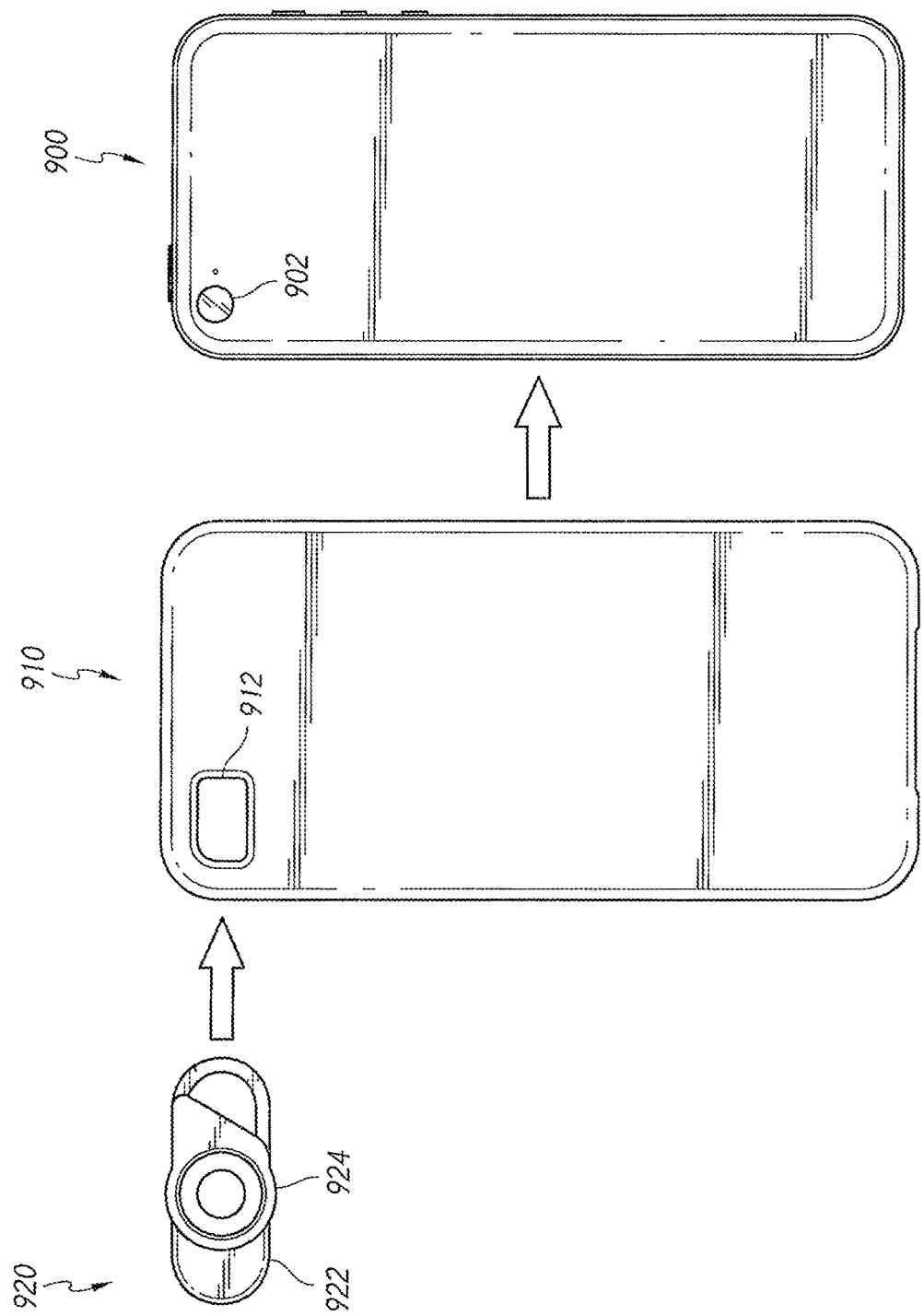
FIG. 18 illustrates an example of a mount or mounting portion that may be removably attached to an auxiliary case for a mobile device.

FIG. 18 shows an example of a removably attachable case 910 for a mobile device 900. The mobile device 900 may have one or more onboard camera lenses 902. The case 910 may be attached to, and removed from, an outer housing of the mobile device 900 by a user. As shown, the case 910 can include a coupling region 912 that is configured to receive a mounting portion 920. The coupling region 912 may provide access to the onboard camera lens 902 (e.g., the coupling region 912 may include an opening or a translucent region that allows light to be conveyed to the onboard camera lens 902 when the case 910 is installed).

A mounting portion 920 may be removably attached to the case 910 to provide any one or more of the features described in any of the embodiments disclosed and/or illustrated anywhere in this specification, including one or more of the optical features as described herein with respect to any of the various auxiliary optical devices. The mounting portion 920 may include one or more optical portions 924 coupled to a base portion 922. The optical portions 924 may be or include lenses, filters, etc. The mounting portion 920 may be attached to the coupling region 912 using a snap fit, an interference fit, a magnetic component, a threaded mount, or some other fastening component or method. In some embodiments, the optical portion 924 may be offset on the base portion 922. For example, the optical portion 924 may be positioned closer to one side than an opposite side (e.g., closer to the left side than the right side of the base portion 922, closer to the top than the bottom, etc.). When the mounting portion 920 is installed in the case 910 in a first position, the optical portion 924 may be placed in optical alignment with a first onboard camera lens of the mobile device 900. A user may remove and rotate the mounting portion 920, and reattach the mounting portion 920 in the case 910 in a second position. In the second position, the optical portion 924 may be in optical alignment with a second onboard camera lens of the mobile device 900.

As with all embodiments in this specification, any feature, structure, step, material, or component that is illustrated and/or described with respect to FIGS. 5 through 18 can be used with any feature, structure, step, material, or component that is illustrated or described throughout the present specification.

What is claimed is:

1. An auxiliary optical device configured to be removably attachable to a mobile electronic device having a top portion with an onboard camera positioned on a face, the auxiliary optical device comprising:
   a retainer portion configured to removably attach to the mobile electronic device along the top portion;
   a mounting portion configured to removably attach to the retainer portion and having an interior surface adjacent to the face of the mobile electronic device that is substantially parallel to the face of the mobile electronic device when the auxiliary optical device is removably attached to the mobile electronic device and the mounting portion is removably attached to the retainer portion, the mounting portion comprising:
      a moveable protrusion;
      a spring associated with the moveable protrusion and configured to resiliently bias the moveable protrusion toward a proud position relative to an exterior surface of the mounting portion; and
      an actuator adapted to slide along an actuation direction substantially parallel to the face of the mobile electronic device and cause the moveable protrusion to retract at least partially into a body of the mounting portion along the actuation direction; and
   an optical portion coupled to the mounting portion, wherein an optical axis of the optical portion is optically aligned with an optical axis of the onboard camera of the mobile electronic device when the auxiliary optical device is removably attached to the mobile electronic device.

2. A combination of the auxiliary optical device of claim 1 and the mobile electronic device.

3. The auxiliary optical device of claim 1 wherein the retainer portion and the mounting portion cooperate to resist rotation of the mounting portion around an axis parallel to the face of the mobile electronic device, thereby maintaining the interior surface of the mounting portion substantially parallel to the face of the mobile electronic device.

4. The auxiliary optical device of claim 1, wherein the actuator comprises an engagement portion extending substantially perpendicular to the actuation direction, outwardly from the mounting portion and configured for manipulation of the moveable protrusion.

5. The auxiliary optical device of claim 1, wherein the retainer portion comprises sidewalls defining:
   a channel, the channel configured to receive the top portion of the mobile electronic device; and
   a through portion extending into the channel and configured to receive the mounting portion, the interior surface of the mounting portion contacting the face of the mobile electronic device when the auxiliary optical device is removably attached to the mobile electronic device and the mounting portion is removably attached to the retainer portion.

6. The auxiliary optical device of claim 5, wherein the sidewalls of the retainer portion further define coupling portions comprising holes formed into one or both of the sidewalls at the through portion configured to receive the moveable protrusion in a proud position.

7. The auxiliary optical device of claim 1, wherein one of the retainer portion or the mounting portion comprises a movement inhibitor, the movement inhibitor configured to contact a corresponding one of the retainer portion or the mounting portion and set an orientation of the mounting portion relative to the face of the mobile electronic device.

8. The auxiliary optical device of claim 7, wherein the movement inhibitor comprises a keyed surface of the mounting portion.

9. The auxiliary optical device of claim 1, wherein the mounting portion is configured to optically align the optical axis of the optical portion with the optical axis of the onboard camera when the mounting portion is coupled to the retainer portion in a first position, and wherein the mounting portion is further configured to optically align the optical axis of the optical portion with an optical axis of a second onboard camera of the mobile electronic device on a second face when the mounting portion is coupled to the retainer portion in a second position.

10. The auxiliary optical device of claim 9, wherein:
   the mounting portion is a first mounting portion; and
   the auxiliary optical device further comprises a second mounting portion configured to removably attach to the retainer portion opposite the first mounting portion, an interior surface of the second mounting portion adjacent to the second face of the mobile electronic device being substantially parallel to the second face of the mobile electronic device when the auxiliary optical device is removably attached to the mobile electronic device in the first position and the second mounting portion is removably attached to the retainer portion.

11. The auxiliary optical device of claim 10, wherein:
the optical portion is a first optical portion; and
the auxiliary optical device further comprises a second optical portion coupled to the second mounting portion, an optical axis of the second optical portion being substantially parallel with the optical axis of the second onboard camera of the mobile electronic device when the auxiliary optical device is removably attached to the mobile electronic device in the first position.

12. The auxiliary optical device of claim 11, wherein, when the auxiliary optical device is removably attached to the mobile electronic device in the second position, the optical axis of the second optical portion is optically aligned with the optical axis of the second onboard camera.

13. The auxiliary optical device of claim 1, wherein:
the moveable protrusion is a first protrusion; and
the mounting portion further comprises a second protrusion extending outwardly from the mounting portion opposite the first protrusion.

14. The auxiliary optical device of claim 13, wherein the second protrusion is fixed relative to an exterior surface of the mounting portion.

15. The auxiliary optical device of claim 14, wherein the first and second protrusions are arranged along a substantially common direction.

16. The auxiliary device of claim 15, wherein the retainer portion comprises sidewalls defining:
a through portion configured to receive the mounting portion, the interior surface of the mounting portion contacting the face of the mobile electronic device when the auxiliary optical device is removably attached to the mobile electronic device and the mounting portion is removably attached to the retainer portion; and
a bore extending linearly through the sidewalls and interrupted by the through portion, the bore configured to receive the first protrusion at a first region of the through portion and the second protrusion at a second region of the through portion.

17. The auxiliary optical device of claim 15, wherein the mounting portion and retainer portion cooperate to limit rotation of the mounting potion about an axis parallel to the face of the mobile electronic device, thereby maintaining the interior surface of the mounting portion substantially parallel to the face of the mobile electronic device.

18. The auxiliary optical device of claim 17, wherein the retainer portion comprises a movement inhibitor.

* * * * *